(12) United States Patent
Iwata et al.

(10) Patent No.: US 10,418,915 B2
(45) Date of Patent: Sep. 17, 2019

(54) REFRIGERATION CYCLE APPARATUS

(71) Applicant: Mitsubishi Electric Corporation, Tokyo (JP)

(72) Inventors: Akihiko Iwata, Tokyo (JP); Kazuhiko Kawai, Tokyo (JP); Tomoaki Kobata, Tokyo (JP); Yusuke Koyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 135 days.

(21) Appl. No.: 15/549,398

(22) PCT Filed: Mar. 31, 2015

(86) PCT No.: PCT/JP2015/060229
§ 371 (c)(1),
(2) Date: Aug. 8, 2017

(87) PCT Pub. No.: WO2016/157443
PCT Pub. Date: Oct. 6, 2016

(65) Prior Publication Data
US 2018/0041137 A1 Feb. 8, 2018

(51) Int. Cl.
*H02M 7/44* (2006.01)
*F25B 1/00* (2006.01)
(Continued)

(52) U.S. Cl.
CPC .................. *H02M 7/44* (2013.01); *F25B 1/00* (2013.01); *F25B 49/02* (2013.01); *H02M 1/00* (2013.01);
(Continued)

(58) Field of Classification Search
CPC ............ H02M 1/00; H02M 1/32; H02M 5/44; H02M 7/44; H02M 2001/0009;
(Continued)

(56) References Cited

U.S. PATENT DOCUMENTS 3,631,332 A * 12/1971 Williamson ............ H02M 5/45
363/173
5,200,644 A * 4/1993 Kobayashi ............ F25B 49/025
307/103
(Continued)

FOREIGN PATENT DOCUMENTS

JP S60-156225 A 8/1985
JP H06-022543 A 1/1994
(Continued)

OTHER PUBLICATIONS

International Search Report of the International Searching Authority dated Jun. 16, 2015 for the corresponding International application No. PCT/JP2015/060229 (and English translation).
(Continued)

*Primary Examiner* — Marc E Norman
(74) *Attorney, Agent, or Firm* — Posz Law Group, PLC

(57) ABSTRACT

A refrigeration cycle apparatus includes: a refrigerant circuit, a use side heat exchanger, a pressure reducing device, and a heat source side heat exchanger; A fan is provided together with at least one, selected from between, the use side heat exchanger and the heat source side heat exchanger and that has a fan motor; a relay unit connected to a direct-current supply device via the direct-current circuit breaker; a resistor unit connected in parallel to the relay unit; a DC/AC converter configured to convert a direct-current voltage supplied from the direct-current supply device via either the relay unit or the resistor unit into an alternating-current voltage and to supply the alternating-current voltage to at least one, selected from between, the compressor motor and the fan motor; and an opening and closing control unit configured to bring the relay unit into an open state when the direct-current circuit breaker becomes open.

11 Claims, 17 Drawing Sheets

(51) Int. Cl.
*H02M 1/00* (2006.01)
*H02M 1/32* (2007.01)
*F25B 49/02* (2006.01)
*H02M 5/44* (2006.01)
*H02P 27/06* (2006.01)
*F25B 13/00* (2006.01)

(52) U.S. Cl.
CPC .............. *H02M 1/32* (2013.01); *H02M 5/44* (2013.01); *F25B 13/00* (2013.01); *F25B 2600/021* (2013.01); *F25B 2600/11* (2013.01); *F25B 2700/15* (2013.01); *H02M 2001/0009* (2013.01); *H02P 27/06* (2013.01); *Y02B 30/741* (2013.01)

(58) Field of Classification Search
CPC .. F25B 1/00; F25B 13/00; F25B 49/02; F25B 2600/021; F25B 2600/11; F25B 2700/15; H02P 27/06; Y02B 30/741
See application file for complete search history.

(56) References Cited

U.S. PATENT DOCUMENTS 9,513,681 B2 * 12/2016 Wang ..................... G06F 1/263

2006/0261751 A1  11/2006  Okabe et al.
2007/0029963 A1   2/2007  Iura et al.

FOREIGN PATENT DOCUMENTS

| | | |
|---|---|---|
| JP | H06-205586 A | 7/1994 |
| JP | H06-351258 A | 12/1994 |
| JP | 2005-124336 A | 5/2005 |
| JP | 2006-325302 A | 11/2006 |
| JP | 2009-232591 A | 10/2009 |
| JP | 2011-087378 A | 4/2011 |
| JP | 2011-089737 A | 5/2011 |
| JP | 2014-017990 A | 1/2014 |
| JP | 2014-181857 A | 9/2014 |

OTHER PUBLICATIONS

"New Release of High-Voltage Direct Current Power Supply Systems for ICT Equipment." http://www.ntt-f.co.jp/news/heisei23/h23-1110.html downloaded May 24, 2017 (and partial English translation).

Office action dated Oct. 2, 2018 issued in corresponding JP patent application No. 2017-508950 (and English translation thereof).

* cited by examiner

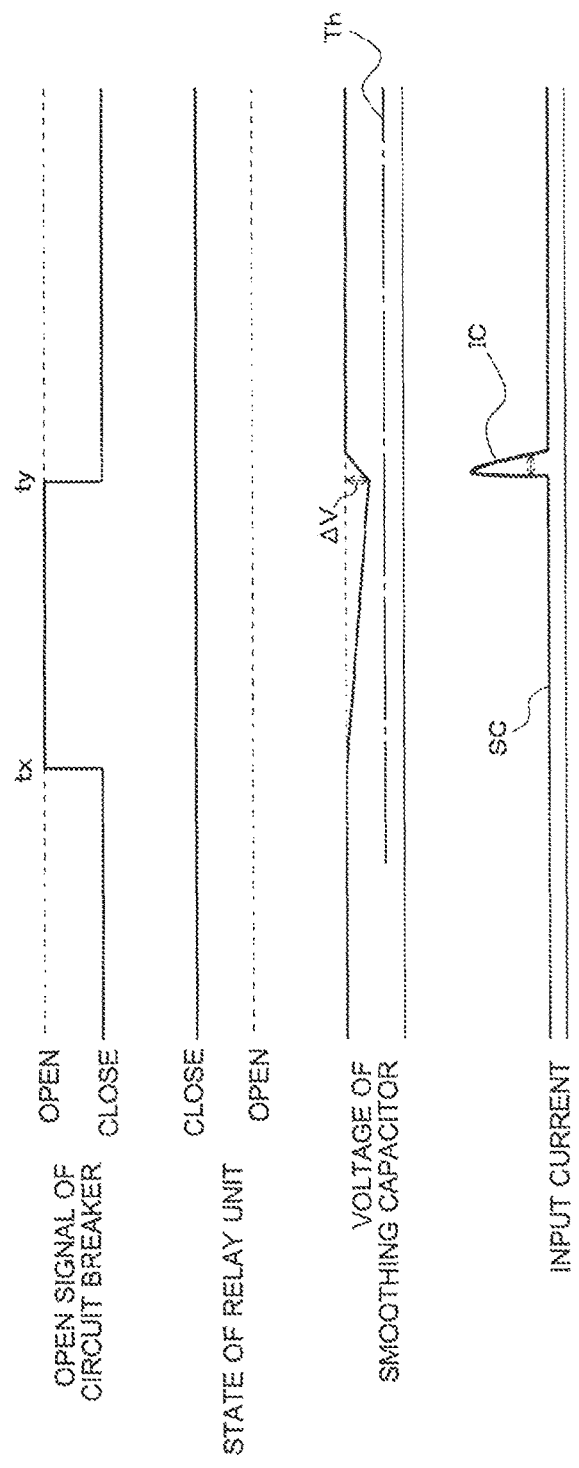

REFRIGERATION CYCLE APPARATUS

CROSS REFERENCE TO RELATED APPLICATION

This application is a U.S. national stage application of PCT/JP2015/060229 filed on Mar. 31, 2015, the contents of which are incorporated herein by reference.

TECHNICAL FIELD

The present invention relates to a refrigeration cycle apparatus operating by receiving a direct-current power supply.

BACKGROUND ART

Conventionally, refrigeration cycle apparatuses such as air conditioning devices are configured to operate by receiving a supply of a three-phase alternating-current power supply from a commercial power source, a generator, or another source (see, Patent Literature 1, for example). Further, in general, electrical component parts (e.g., a motor of a compressor, a motor of a fan, a solenoid valve, and other elements) constituting a refrigeration cycle apparatus operate by using a three-phase 200-VAC source, a single-phase 200-V AC source, a 12-V DC source, or another power source, as a primary power source thereof. For this reason, refrigeration cycle apparatuses are configured to generate a voltage to be used by electrical component parts from a three-phase 200-V AC source serving as the primary power source and to supply the generated voltage to a refrigerant circuit system thereof.

Further, in a refrigeration cycle apparatus described in Patent Literature 1, a large-capacity inverter device (see Patent Literature 2, for example) is used for driving motors of a compressor, a fan, and other elements. In inverter devices such as the one described in Patent Literature 2, a commonly-used method is a method by which a direct-current bus voltage for driving the inverter is generated by rectifying a three- or two-phase alternating current.

As another example, at data centers and other facilities provided with a large-capacity Information and Communication Technology (ICT) apparatus, there is a trend to significantly improve the efficiency of the system by replacing an alternating-current power supply system with a high-voltage direct-current power supply system (see Non-Patent Literature 1, for example). In such a configuration, it is possible to use the supplied high direct-current voltage as a voltage for driving the inverter device provided in the refrigeration cycle apparatus, without applying any modification thereto. Consequently, it is possible to simplify the configuration of the refrigeration cycle apparatus and to improve the efficiency of the refrigeration cycle apparatus.

Next, a typical configuration of an electrical circuit of an AC-input type refrigeration cycle apparatus (hereinafter, "alternating-current (AC) refrigeration cycle apparatus 1000") will be explained. FIG. 16 is a circuit diagram illustrating a schematic configuration of an electrical system of the AC refrigeration cycle apparatus 1000. The AC refrigeration cycle apparatus 1000 includes a compressor motor 1030, a DC/AC converter 1021, a smoothing capacitor 1022, a relay unit 1023, a resistor circuit 1024, a three-phase full-wave rectifying circuit 1007, and a zero-cross sensor 1014.

The compressor motor 1030 is configured to drive a compressor (not illustrated).

The DC/AC converter 1021 is configured to drive the compressor motor 1030.

The smoothing capacitor 1022 is configured to smooth an electric current (hereinafter, "current") supplied to the DC/AC converter 1021.

The relay unit 1023 and the resistor circuit 1024 are configured to suppress an inrush current that may flow from an alternating-current system (hereinafter, "AC system") into the smoothing capacitor 1022, when power is supplied from an alternating-current circuit breaker (hereinafter, "AC circuit breaker") 1100.

The three-phase full-wave rectifying circuit 1007 is configured to rectify an alternating current into a direct current.

The zero-cross sensor 1014 is configured to detect the presence of an alternating-current voltage (hereinafter, "AC voltage").

Next, an operation of the AC refrigeration cycle apparatus 1000 will be explained.

The voltage supplied from an AC system 1300 is taken into the AC refrigeration cycle apparatus 1000 via a system impedance 1011 and the AC circuit breaker 1100. The system voltage taken into the AC refrigeration cycle apparatus 1000 is converted from the alternating current into a direct current by the three-phase full-wave rectifying circuit 1007.

The voltage converted into a direct-current voltage (hereinafter, "DC voltage") by the three-phase full-wave rectifying circuit 1007 is supplied to the smoothing capacitor 1022 via the relay unit 1023 and the resistor circuit 1024. Further, the direct-current bus voltage smoothed by the smoothing capacitor 1022 is input to the DC/AC converter 1021. In this manner, the AC refrigeration cycle apparatus 1000 drives the compressor motor 1030.

When the power is supplied from the AC circuit breaker 1100, the AC refrigeration cycle apparatus 1000 brings the relay unit 1023 into an open state and slowly charges the smoothing capacitor 1022 by using a small current, from the system via an inrush prevention resistor. Further, when the smoothing capacitor 1022 has been charged with a sufficient amount of DC voltage, the AC refrigeration cycle apparatus 1000 brings the relay unit 1023 into a closed state, so that the DC/AC converter 1021 starts driving the compressor motor 1030.

The commonly-used AC refrigeration cycle apparatus 1000 is provided with a circuit breaker open state determination function to determine the open state of the AC circuit breaker 1100 to prevent an excessive inrush current from flowing therein when the power supply is resumed after the AC circuit breaker 1100 becomes open for some reason during the operation. The AC refrigeration cycle apparatus 1000 is configured so that, when it is determined that the AC circuit breaker 1100 is open, the relay unit 1023 is brought into an open state.

Examples of the circuit breaker open state determination function include a function configured to detect the presence of an AC voltage input to the AC refrigeration cycle apparatus 1000 by using the zero-cross sensor 1014 and to, when the voltage from the AC voltage source has no point crossing zero, determine that no alternating current is present, i.e., that the AC circuit breaker 1100 is open.

As for the AC refrigeration cycle apparatus 1000, by using the circuit breaker open state determination function achieved with the zero-cross sensor 1014, the relay unit 1023 is kept open when the AC circuit breaker 1100 is determined to be open, in response to once becoming open of the AC circuit breaker 1100. With this configuration, it is possible to prevent an inrush current from flowing in, when the AC circuit breaker 1100 becomes closed after that.

Further, in the AC refrigeration cycle apparatus 1000, also when the AC system 1300 experiences an instantaneous voltage drop and the voltage subsequently recovers, a large charging current flows into the smoothing capacitor 1022. However, the AC refrigeration cycle apparatus 1000 is configured so that the system impedance 1011 suppresses the current to some extent. For this reason, by configuring the smoothing capacitor 1022 or another element with an appropriate design, it is possible to avoid an impact that may be made on the AC refrigeration cycle apparatus 1000 by such a large charging current.

Next, a typical configuration of an electrical circuit in a DC-input type refrigeration cycle apparatus (hereinafter, "direct-current (DC) refrigeration cycle apparatus 2000") will be explained. FIG. 17 is a circuit diagram illustrating a schematic configuration of the electrical system of the DC refrigeration cycle apparatus 2000. The DC refrigeration cycle apparatus 2000 includes a compressor motor 2030, a DC/AC converter 2021, a smoothing capacitor 2022, a relay unit 2023, and a resistor circuit 2024. These elements function in the same manner as the compressor motor 1030, the DC/AC converter 1021, the smoothing capacitor 1022, the relay unit 1023, and the resistor circuit 1024 included in the AC refrigeration cycle apparatus 1000.

To the DC refrigeration cycle apparatus 2000, a DC voltage is supplied via a AC/DC converter 2210 configured to convert the voltage from an AC system 2300 into a direct current and a DC circuit breaker 2100 configured to open and close the direct current. A battery 2220 is installed on the output side of the AC/DC converter 2210. The battery 2220 is provided for the purpose of stabilizing the high-voltage direct current.

Next, an operation of the DC refrigeration cycle apparatus 2000 will be explained.

The voltage supplied from the AC system 2300 is converted into a high-voltage direct current (a direct current of approximately 380 V when a 400-V AC system is used) by the AC/DC converter 2210 and is subsequently taken into the DC refrigeration cycle apparatus 2000 via the DC circuit breaker 2100. The DC voltage taken into the DC refrigeration cycle apparatus 2000 goes through the relay unit 2023 and the resistor circuit 2024 and is further supplied to the smoothing capacitor 2022. Further, the DC voltage smoothed by the smoothing capacitor 2022 is input to the DC/AC converter 2021. In this manner, the DC refrigeration cycle apparatus 2000 drives the compressor motor 2030.

Further, by using the configuration described above, even when the refrigeration cycle apparatus is applied to an air conditioning system for a data center, it is possible, as indicated in Non Patent Literature 1, to reduce power losses because the power corresponding to the one DC/AC converter provided on the uninterruptible power supply device side and the power corresponding to the one AC/DC converter provided on the load side become unnecessary.

In this situation, the battery 2220 not only stabilizes the DC voltage but also serves as a back-up power source when the power supply from the AC system 2300 stops due to a power failure or another cause. However, the output voltage of the battery 2220 varies depending on the charged state (the remaining charge) thereof and, in general, a lowest output voltage is as low as approximately 70% of a highest output voltage. More specifically, when a 400-V AC system is used as the AC system 2300, although the high DC voltage is set to approximately 380 V, the lowest output voltage of the battery 2220 in that situation is approximately 270 V.

In the DC refrigeration cycle apparatus 2000 illustrated in FIG. 17, when the DC circuit breaker 2100 is turned on, the relay unit 2023 operates to suppress the inrush current that may flow from either the AC/DC converter 2210 or the battery 2220 into the smoothing capacitor 2022. More specifically, when the voltage of the smoothing capacitor 2022 is equal to or lower than a predetermined level, the relay unit 2023 is open, and initial charging of the smoothing capacitor 2022 is performed slowly via the resistor circuit 2024. Further, when the voltage of the smoothing capacitor 2022 has reached the predetermined level, the relay unit 2023 is brought into a closed state. With this arrangement, it is possible to prevent the occurrence of losses, because the current flowing for the operation of the compressor thereafter bypasses to flow through the relay unit 2023. In addition, the operation performed when the AC circuit breaker 1100 is turned on in the AC refrigeration cycle apparatus 1000 illustrated in FIG. 16 is also the same.

Also while the DC refrigeration cycle apparatus 2000 is in an operating state, it is necessary to provide a circuit breaker open state determination function to determine the open state of the DC circuit breaker 2100 to prevent an excessive inrush current from flowing therein when the power supply is resumed after the DC circuit breaker 2100 becomes open for some reason.

Examples of the circuit breaker open state determination function used in the DC refrigeration cycle apparatus 2000 include a function configured to determine that the DC circuit breaker 2100 has become open when the voltage of the smoothing capacitor 2022 becomes equal to or lower than an insufficient voltage judgment threshold value Th. The insufficient voltage judgment threshold value Th is set to a value smaller than a lower limit for a tolerated DC voltage. For example, when the DC voltage described above is in the range from 380 V to 270 V, the insufficient voltage judgment threshold value Th is set to a value smaller than 270 V. When the DC circuit breaker 2100 becomes open, because the power keeps being supplied from the smoothing capacitor 2022 to the load, the voltage of the smoothing capacitor 2022 decreases, and after a predetermined period of time has elapsed, it is determined that the DC circuit breaker 2100 is open. In the DC refrigeration cycle apparatus 2000, when the DC circuit breaker 2100 is determined to be open, the relay unit 2023 becomes open, in the same manner as in the AC refrigeration cycle apparatus 1000.

CITATION LIST

Patent Literature

Patent Literature 1: Japanese Unexamined Patent Application Publication No. 2011-89737

Patent Literature 2: Japanese Unexamined Patent Application Publication No. 2009-232591

Non Patent Literature

Non Patent Literature 1: http://www.ntt-f.co.jp/news/heisei23/h23-1110.html

SUMMARY OF INVENTION

Technical Problem

However, as illustrated in FIG. 16, the circuit breaker open state determination function realized by using the zero-cross sensor 1014 has a device configuration based on the assumption that the primary power source is a three-phase alternating-current power source. Consequently, when a high-voltage direct-current power supply such as a 380-V DC power supply is used as the primary power source, it is not possible to use the abovementioned determination function.

Further, even when the circuit breaker open state determination function realized by using the insufficient voltage judgment threshold value Th is applied to the DC refrigeration cycle apparatus 2000 illustrated in FIG. 17, because the insufficient voltage judgment threshold value Th is, according to the conventional technique, set to a value that is sufficiently smaller than the voltage of the smoothing capacitor 2022 observed while the DC circuit breaker 2100 is kept closed. Consequently, a certain time lag occurs before the DC circuit breaker 2100 is determined to be open after the DC circuit breaker 2100 becomes open. For this reason, a problem arises where it is not possible to prevent an excessive inrush current from flowing in when the DC circuit breaker 2100 becomes closed during this time lag.

In other words, as illustrated in the time chart in FIG. 18 indicating a transition of the voltage of the smoothing capacitor 2022 in the DC refrigeration cycle apparatus 2000, when the DC circuit breaker 2100 becomes open for some reason at a time tx when the DC refrigeration cycle apparatus 2000 is in an operating state, the voltage of the smoothing capacitor 2022 starts decreasing. Further, when the DC circuit breaker 2100 becomes closed again at a time ty, which is before the time when the voltage of the smoothing capacitor 2022 decreases to be equal to or lower than the insufficient voltage judgment threshold value Th, an inrush current that is very much larger than a steady-state current SC flows along an overcurrent route ICR or another route, due to a difference ΔV between the voltage of the battery 2220 and the voltage of the smoothing capacitor 2022. As a result, an excessive overcharging current flows into the smoothing capacitor 2022. This situation occurs because the battery 2220 is in the state of directly charging the smoothing capacitor 2022. Further, there is a possibility that various types of component parts (e.g., the relay unit 2023, the smoothing capacitor 2022, and other component parts that are not illustrated in the drawings such as a noise filter, connection terminals, wirings, printed circuit board, etc.) provided on the path from the battery 2220 to the smoothing capacitor 2022 or another path may be damaged by the passing of the inrush current.

To overcome the problems described above, an object of an embodiment of the present invention is to provide a refrigeration cycle apparatus capable of preventing an excessive current from flowing in the smoothing capacitor, etc., when the DC circuit breaker transitions from an open state into a closed state.

Solution to Problem

A refrigeration cycle apparatus according to an embodiment of the present invention includes: a refrigerant circuit structured by sequentially connecting a compressor having a compressor motor, a use side heat exchanger, a pressure reducing device, and a heat source side heat exchanger, by using a refrigerant pipe; a fan that is provided together with at least one, selected from between, the use side heat exchanger and the heat source side heat exchanger and that has a fan motor; a relay unit connected to a direct-current supply device via a direct-current circuit breaker; a resistor unit connected in parallel to the relay unit; a DC/AC converter configured to convert a direct-current voltage supplied from the direct-current supply device via either the relay unit or the resistor unit into an alternating-current voltage and to supply the alternating-current voltage to at least one, selected from between, the compressor motor and the fan motor; and an opening and closing control unit configured to bring the relay unit into an open state when the direct-current circuit breaker becomes open.

Advantageous Effects of Invention

The one embodiment of the present invention adopts the configuration including: the relay unit connected to the direct-current supply device via the direct-current circuit breaker; and the resistor unit connected in parallel to the relay unit, so that when the direct-current circuit breaker becomes open, the opening and closing control unit brings the relay unit into the open state. Accordingly, when the DC circuit breaker 100 transitions from the open state into a closed state again, the current flowing in from the direct-current supply device flows into the smoothing capacitor via the resistor unit. Consequently, it is possible to prevent an excessive current from flowing in, when the direct-current circuit breaker transitions from the open state into the closed state.

BRIEF DESCRIPTION OF DRAWINGS

FIG. 18 is a time chart illustrating a transition of the voltage of a smoothing capacitor in the refrigeration cycle apparatus illustrated in FIG. 17.

DESCRIPTION OF EMBODIMENTS

Embodiment 1

Figure 1:
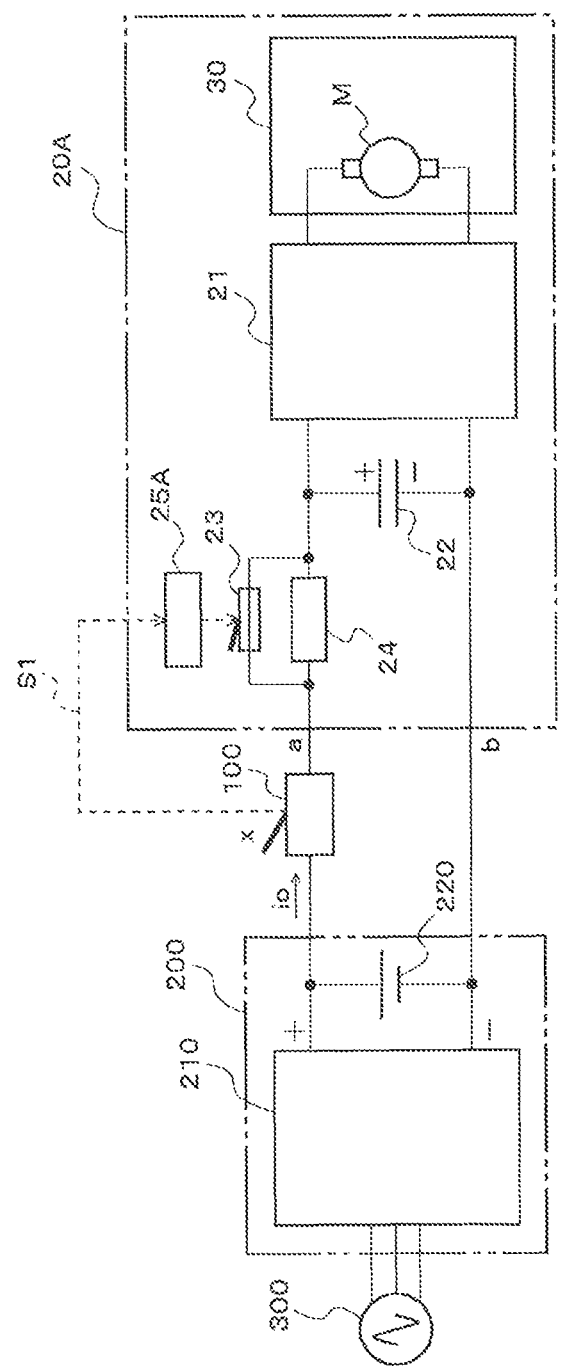
FIG. 1 is a circuit diagram illustrating a schematic configuration of an electrical system of a refrigeration cycle apparatus according to Embodiment 1 of the present invention.

FIG. 1 is a circuit diagram illustrating a schematic configuration of an electrical system of a refrigeration cycle apparatus 20A according to Embodiment 1 of the present invention. As illustrated in FIG. 1, the refrigeration cycle apparatus 20A includes: a refrigerant circuit system 30 including a motor M; a DC/AC converter 21 configured to drive the motor M; a smoothing capacitor 22 configured to smooth a current supplied to the DC/AC converter 21; a relay unit 23 connected to a direct-current supply device (hereinafter, "DC supply device") 200 via a direct-current circuit breaker (hereinafter, "DC circuit breaker") 100; a resistor unit (a resistor circuit) 24 connected in parallel to the relay unit 23; and an opening and closing control unit 25A configured to control opening and closing operations of the relay unit 23. In other words, the refrigeration cycle apparatus 20A is a direct-current supply type refrigeration cycle apparatus driven by a DC voltage supplied from the DC supply device 200.

The smoothing capacitor 22 is connected to an input terminal of the DC/AC converter 21 and is configured to smooth the DC voltage input thereto from the DC supply device 200. The opening and closing control unit 25A is configured to bring the relay unit 23 into an open state when the DC circuit breaker 100 becomes open. More specifically, the opening and closing control unit 25A is configured to bring the relay unit 23 into the open state when receiving an input of an open signal being output from the DC circuit breaker 100 and indicating that the DC circuit breaker 100 is open.

In Embodiment 1, the DC circuit breaker 100 has a function of transmitting an open/close signal S1 indicating the open/closed state thereof to the outside, by using a contact relay (not illustrated) or another element. More specifically, the DC circuit breaker 100 is configured in such a manner that, for example, the open/closed state of the DC circuit breaker 100 is in conjunction with the open/closed state of the contact relay. The open/close signal S1 output from the DC circuit breaker 100 is input to the opening and closing control unit 25A of the refrigeration cycle apparatus 20A. The opening and closing control unit 25A is configured to bring the relay unit 23 into the open state when the open/close signal S1 output from the DC circuit breaker 100 is the open signal indicating that the DC circuit breaker 100 is open.

The DC supply device 200 includes: an AC/DC converter 210 configured to convert an AC voltage supplied from an AC system 300 into a DC voltage; and a battery 220 provided on the output side of the AC/DC converter 210 and configured to stabilize the high-voltage DC. Further, the battery 220 not only stabilizes the DC voltage, but also serves as a back-up power supply when the power supply from the AC system 300 stops due to a power failure or another cause.

Figure 2:
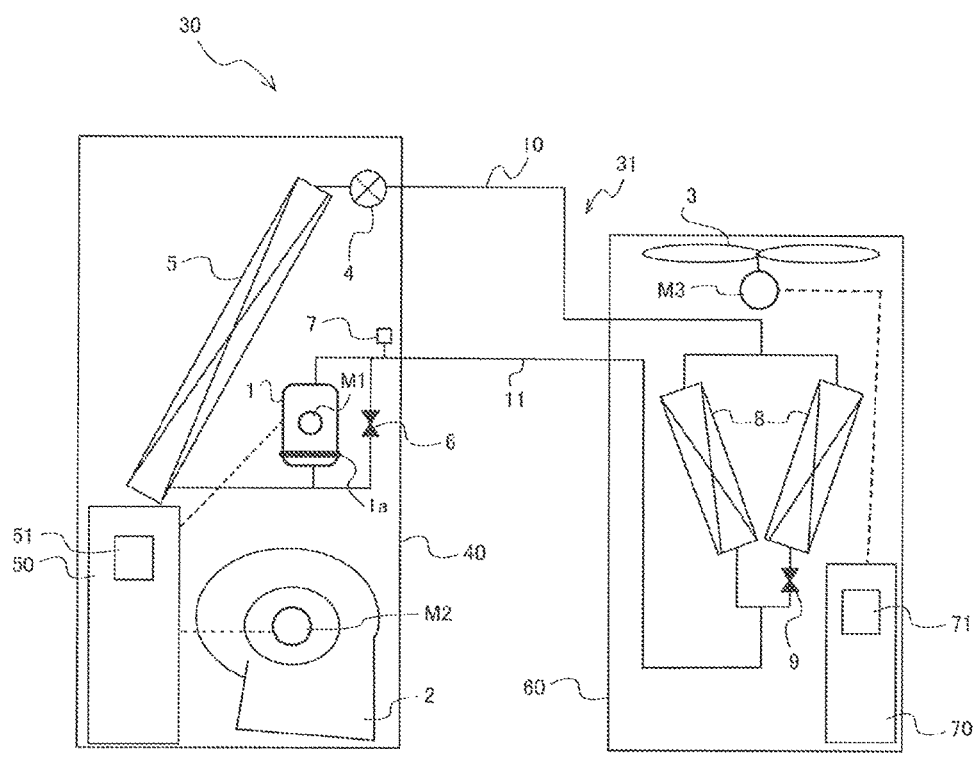
FIG. 2 is a circuit diagram illustrating a schematic configuration of a refrigerant circuit system according to Embodiment 1 of the present invention.

Next, a device configuration of the refrigerant circuit system 30 will be explained, with reference to FIG. 2. FIG. 2 is a circuit diagram illustrating a schematic configuration of the refrigerant circuit system 30 according to Embodiment 1 of the present invention. As illustrated in FIG. 2, the refrigerant circuit system 30 includes an indoor unit 40 and an outdoor unit 60. The indoor unit 40 and the outdoor unit 60 are connected to each other by a refrigerant pipe 10 and a refrigerant pipe 11.

The indoor unit 40 has installed therein an expansion valve 4, a use side heat exchanger 5, and a compressor 1 having a compressor motor M1 that are connected in series. Further, the indoor unit 40 has installed therein an indoor solenoid valve 6 connected in parallel to the compressor 1. On a discharge side of the compressor 1, a pressure open/close switch 7 is installed. Further, the indoor unit 40 has installed therein a fan 2 having a fan motor M2. Further, the indoor unit 40 includes an indoor control device 50.

The expansion valve 4 serves as a pressure reducing device to reduce the pressure of refrigerant and expand the refrigerant. The expansion valve 4 may be configured by using an electronic expansion valve of which the opening degree can variably be controlled. The use side heat exchanger 5 serves as an evaporator during a cooling operation and as a condenser during a heating operation. In the vicinity of the use side heat exchanger 5, the fan 2 configured with a centrifugal fan, a multi-blade fan, or another type of fan used for supplying air is additionally provided. The fan 2 is configured with a device of such a type that, for example, the rotation speed thereof is controlled by an inverter so that the volume of the air is controlled. In other words, the use side heat exchanger 5 is configured to perform a heat exchange process between the air supplied from the fan 2 and the refrigerant, to evaporate and gasify or to condense and liquify the refrigerant.

The compressor 1 is configured to suck in the refrigerant through the refrigerant pipe and to bring the sucked-in refrigerant into a high-temperature and high-pressure state by compressing the refrigerant. The compressor 1 is configured in such a manner that, for example, the rotation speed of the compressor motor M1 is controlled by an inverter so that the capacity thereof is controlled. Further, the compressor 1 has a belt heater 1a attached thereto to prevent the refrigerant from becoming stagnant. By being controlled to open and close, the indoor solenoid valve 6 is configured to permit a part of the refrigerant discharged from the compressor 1 to be conducted therethrough. The pressure open/close switch 7 serves as a protection device and is configured to detect that the pressure of the refrigerant enclosed in a refrigerant circuit 31 (explained later) has reached a predetermined level.

The indoor control device 50 includes an arithmetic device 51 provided with a general-purpose CPU, a data bus, an input/output port, a non-volatile memory, a timer, and other elements. The indoor control device 50 is configured to exercise predetermined control over the driving frequency of the compressor 1, the rotation speed of the fan 2, the opening degree of the expansion valve 4, and opening and closing of the indoor solenoid valve 6, on the basis of operation information (about the temperature of indoor air, a set temperature, the temperature of the refrigerant pipes, the refrigerant pressure, and other factors). Further, the indoor control device 50 is connected to an outdoor control device 70 (explained later) by a transmission line (not illustrated) and is able to transmit and receive various types of information to and from the outdoor control device 70.

The outdoor unit 60 has installed therein one or more heat source side heat exchangers 8. FIG. 2 illustrates an example in which two heat source side heat exchangers 8 connected in parallel are installed. The outdoor unit 60 has installed therein an outdoor solenoid valve 9 connected in series to one of the heat source side heat exchangers 8. Further, the outdoor unit 60 has installed therein a fan 3 having a fan motor M3. Further, the outdoor unit 60 includes the outdoor control device 70.

The heat source side heat exchangers 8 function as condensers during a cooling operation and as evaporators during a heating operation. In the vicinity of the heat source side heat exchangers 8, the fan 3 configured with a centrifugal fan, a multi-blade fan, or another type of fan used for supplying air is additionally provided. The fan 3 is configured so that, for example, the rotation speed of the fan motor M3 is controlled by an inverter so that the volume of the air is controlled. In other words, the heat source side heat exchangers 8 are configured to perform a heat exchange process between the air supplied from the fan 3 and the refrigerant, to evaporate and gasify or to condense and liquify the refrigerant. Being controlled to open and close, the outdoor solenoid valve 9 is configured to permit a part of the refrigerant to be conducted to the one of the heat source side heat exchangers 8.

The outdoor control device 70 includes an arithmetic device 71 provided with a general-purpose CPU, a data bus, an input/output port, a non-volatile memory, a timer, and other elements. The outdoor control device 70 is configured to exercise predetermined control over the rotation speed of the fan 3, opening and closing of the outdoor solenoid valve 9, and other elements, on the basis of operation information (about the temperature of indoor air, a set temperature, the temperature of the refrigerant pipes, the refrigerant pressure, and other factors) provided from the indoor unit 40. Further, the outdoor control device 70 is connected to the indoor control device 50 by a transmission line (not illustrated) and is able to transmit and receive various types of information to and from the indoor control device 50.

Further, a refrigeration cycle is structured by sequentially connecting the compressor 1, the heat source side heat exchangers 8, the expansion valve 4, and the use side heat exchanger 5, by using the refrigerant pipes 10 and 11. In other words, the refrigerant circuit system 30 includes the refrigerant circuit 31 structured by the refrigeration cycle formed by the compressor 1, the heat source side heat exchangers 8, the expansion valve 4, and the use side heat exchanger 5.

As explained above, the refrigeration cycle apparatus 20A includes: the refrigerant circuit 31 structured by sequentially connecting, by using the refrigerant pipes, the compressor 1 having the compressor motor M1, the use side heat exchanger 5, the expansion valve 4, and the heat source side heat exchangers 8; the fan 2 that is provided together with the use side heat exchanger 5 and is driven by the rotation of the fan motor M2; and the fan 3 that is provided together with the heat source side heat exchangers 8 and is driven by the rotation of the fan motor M3.

In other words, the motor M illustrated in FIG. 1 is represented by at least one selected from among the compressor motor M1, the fan motor M2, and the fan motor M3. That is to say, the DC/AC converter 21 is configured to convert the DC voltage supplied from the DC supply device 200 via at least one, selected from between, the relay unit 23 and the resistor unit 24 into the AC voltage and to supply the AC voltage to at least one selected from among the compressor motor M1, the fan motor M2, and the fan motor M3. Alternatively, the refrigeration cycle apparatus 20A may be configured so as not to include one of the fan motors M2 and M3.

Figure 3:
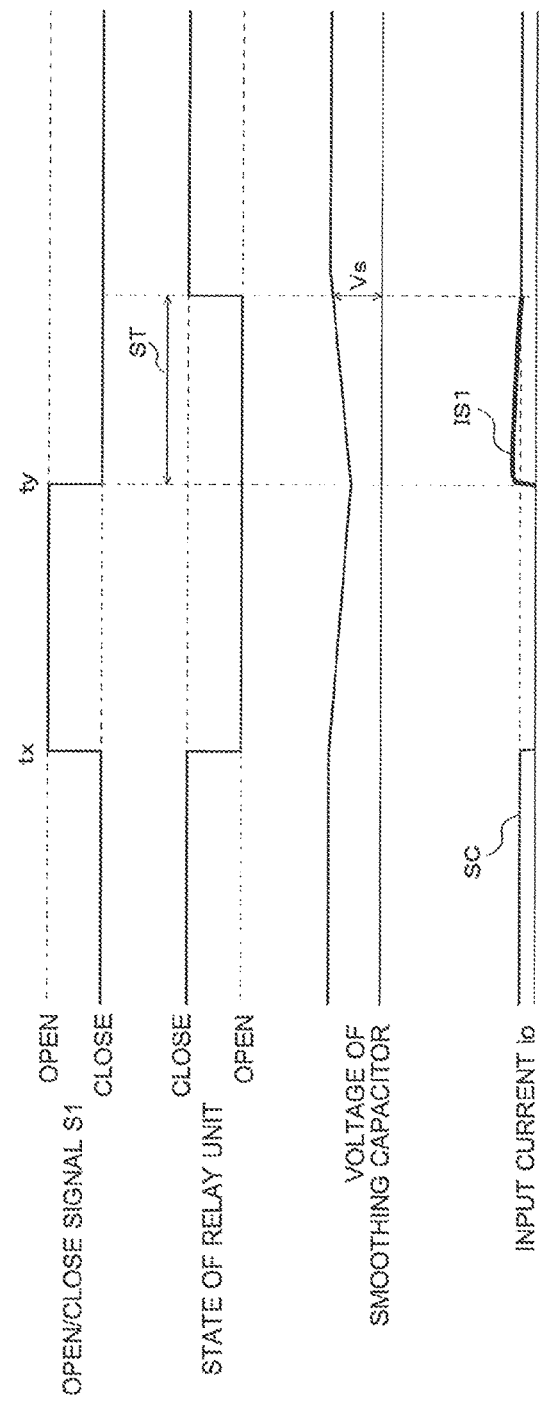
FIG. 3 is a time chart illustrating an open/closed state of a relay unit in the refrigeration cycle apparatus illustrated in FIG. 1.

Next, an operation of the opening and closing control unit 25A will be explained, with reference to FIG. 3. FIG. 3 is a time chart illustrating an open/closed state of the relay unit 23 in the refrigeration cycle apparatus 20A. In FIG. 3, the relay unit 23 is open because the closed state of the relay unit 23 is cancelled at the same time as the DC circuit breaker 100 outputs the open signal.

In the example illustrated in FIG. 3, the DC circuit breaker 100 becomes open at a time tx. At the time tx when the DC circuit breaker 100 becomes open, the DC circuit breaker 100 transmits an open signal serving as the open/close signal S1 to the opening and closing control unit 25A. When receiving an input of the open signal from the DC circuit breaker 100, the opening and closing control unit 25A brings the relay unit 23 into the open state.

When the DC circuit breaker 100 becomes open, because the current stops being supplied from the DC supply device 200 to the refrigeration cycle apparatus 20A, the voltage of the smoothing capacitor 22 decreases as illustrated in FIG. 3. After that, at the time ty, when the DC circuit breaker 100 becomes closed again, the current flowing from the DC supply device 200 into the refrigeration cycle apparatus 20A flows into the smoothing capacitor 22 via the resistor unit 24, so that the smoothing capacitor 22 is charged. At this time, the current used for charging the smoothing capacitor 22 is added to a steady-state current SC; however, because the current is supplied to the smoothing capacitor 22 via the resistor unit 24, no excessive inrush current flows in. After that, the voltage of the smoothing capacitor 22 gradually recovers, and when the voltage has reached a predetermined value, the opening and closing control unit 25A brings the relay unit 23 into a closed state again, and the refrigeration cycle apparatus 20A returns to a steady state.

In Embodiment 1, the opening and closing control unit 25A brings the relay unit 23 into the open state when the voltage of the smoothing capacitor 22 becomes substantially equal to the voltage of the battery 220. In other words, the opening and closing control unit 25A brings the relay unit 23 into the open state when the voltage of the smoothing capacitor 22 has reached a switch reference voltage Vs set on the basis of the voltage of the battery 220.

A stable time period ST from the time when the DC circuit breaker 100 is turned on again to the time when the relay unit 23 becomes closed again is a short period of time until the smoothing capacitor 22 is charged again. During the stable time period ST, because an input current io input from the DC supply device 200 goes through the resistor unit 24, electric power is also consumed by the resistor unit 24.

The refrigeration cycle apparatus 20A according to Embodiment 1 adopts the configuration in which, when the open signal is output from the DC circuit breaker 100, the opening and closing control unit 25A brings the relay unit 23 into the open state. Consequently, when the refrigeration cycle apparatus 20A is used, even when the DC circuit breaker 100 that was once open becomes closed again, because the input current io input from the DC supply device 200 goes through the resistor unit 24, it is possible to prevent an inrush current from flowing into the inside, as illustrated with an inrush prevention current IS1 during the stable time period ST in FIG. 3.

The refrigerant circuit system 30 illustrated in FIG. 2 is merely an example of a system including a refrigeration cycle. In other words, possible configurations of the refrigerant circuit system 30 in the refrigeration cycle apparatus 20A are not limited to the configuration illustrated in FIG. 2. The number of the constituent devices installed in the outdoor unit (the heat source unit) and the indoor unit (the load side unit) may be changed as appropriate in accordance with the purpose of use of the refrigeration cycle apparatus 20A. Further, there is no restriction about the numbers with respect to the outdoor unit (the heat source unit) and the indoor unit (the load side unit), either. The refrigerant circuit system 30 may be arranged to include an arbitrary number of outdoor units and an arbitrary number of indoor units, as appropriate.

Embodiment 2

Figure 4:
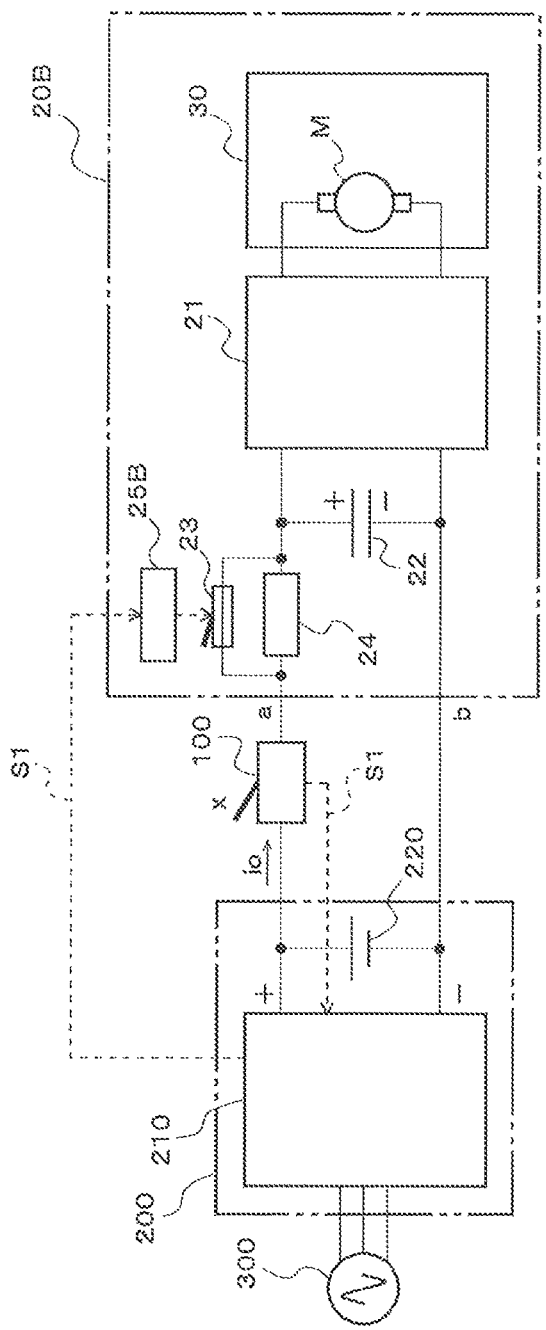
FIG. 4 is a circuit diagram illustrating a schematic configuration of an electrical system of a refrigeration cycle apparatus according to Embodiment 2 of the present invention.
Figure 5:
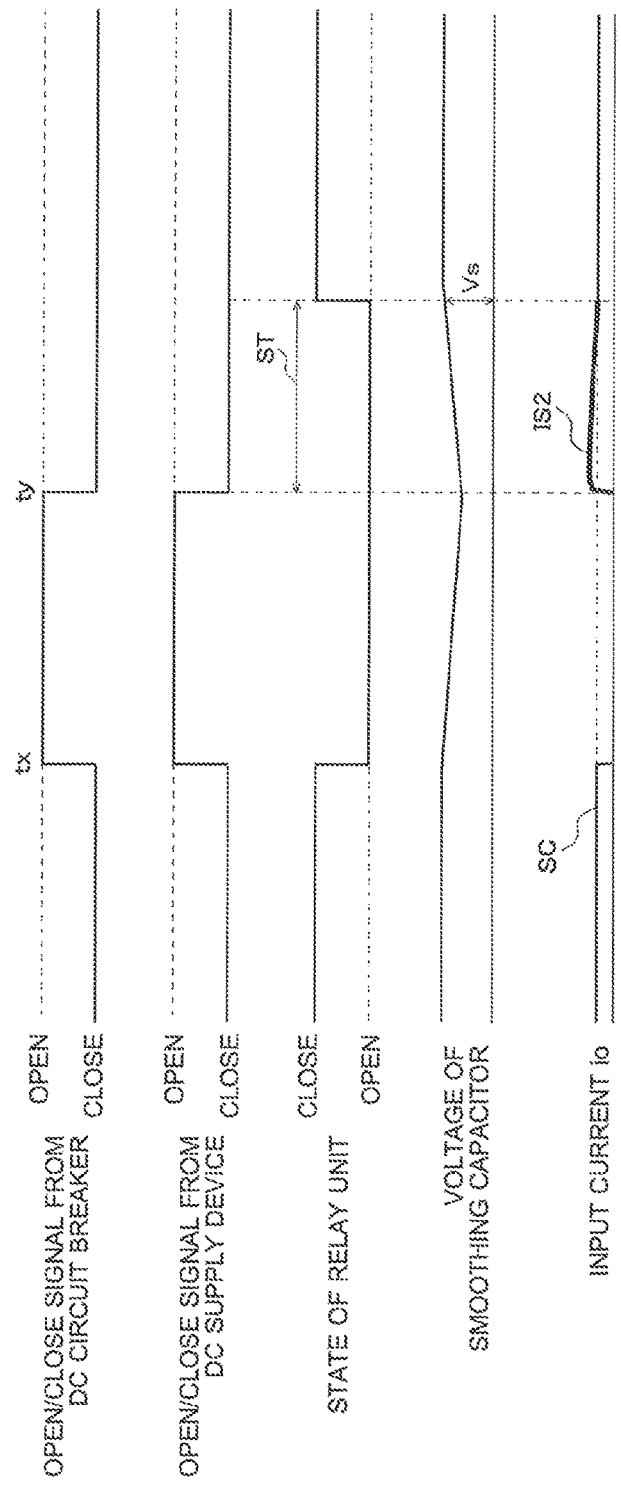
FIG. 5 is a time chart illustrating an open/closed state of a relay unit in the refrigeration cycle apparatus illustrated in FIG. 4.

Next, a refrigeration cycle apparatus 20B according to Embodiment 2 of the present invention will be explained, with reference to FIG. 4 and FIG. 5. FIG. 4 is a circuit diagram illustrating a schematic configuration of an electrical system of the refrigeration cycle apparatus 20B according to Embodiment 2. FIG. 5 is a time chart illustrating an open/closed state of the relay unit 23 in the refrigeration cycle apparatus 20B. Similarly to Embodiment 1 described above, the DC circuit breaker 100 has the function of transmitting the open/close signal S1 indicating the open/closed state thereof to the outside; however, in Embodiment 2, the DC circuit breaker 100 adopts a configuration in which the open/close signal S1 is transmitted to the AC/DC converter 210 included in the DC supply device 200. Some of the constituent members that are equivalent to those in Embodiment 1 will be referred to by using the same reference characters, and the explanations thereof will be omitted.

The opening and closing control unit 25B provided for the refrigeration cycle apparatus 20B is configured to control the open/closed state of the relay unit 23, on the basis of the open/close signal S1 being output from the DC circuit breaker 100, being input via the DC supply device 200, and indicating the open/closed state of the DC circuit breaker 100. In this situation, because the open/close signal provided from the DC circuit breaker 100 and the open/close signal provided from the DC supply device 200 are the same type of signals, these signals will be both referred to by using the same reference symbol "S1" for the sake of convenience.

More specifically, the open/close signal S1 supplied from the DC circuit breaker 100 is once input to the AC/DC converter 210 installed on the upstream side. The AC/DC converter 210 is configured to use the open/close signal S1 provided from the DC circuit breaker 100 as a parameter for a state monitoring purpose. Further, at the same time as the open/close signal S1 is input thereto from the DC circuit breaker 100, the AC/DC converter 210 is configured to output the open/close signal S1 to the opening and closing control unit 25B of the refrigeration cycle apparatus 20B. In other words, the open signal serving as the open/close signal S1 is output from the DC circuit breaker 100 via the DC supply device 200.

Next, an operation of the opening and closing control unit 25B will be explained, with reference to FIG. 5. As illustrated in FIG. 5, when the open/close signal S1 supplied from the DC circuit breaker 100 is the open signal indicating that the DC circuit breaker 100 is open, the open/close signal S1 from the DC supply device 200 output at the same time also rises as an open signal. In other words, when the opening and closing control unit 25B receives the open signal indicating that the DC circuit breaker 100 is open, as the open/close signal S1 output from the DC circuit breaker 100 via the DC supply device 200, the opening and closing control unit 25B cancels the closed state of the relay unit 23 and brings the relay unit 23 into an open state.

When the DC circuit breaker 100 becomes open (at the time tx), the voltage of the smoothing capacitor 22 decreases, as illustrated in the example in FIG. 5. After that, at the time ty, when the DC circuit breaker 100 becomes closed again, the input current io input from the DC supply device 200 flows into the smoothing capacitor 22 via the resistor unit 24, so that the smoothing capacitor 22 is charged. At this time, the current used for charging the smoothing capacitor 22 is added to the steady-state current SC; however, no excessive inrush current flows, as illustrated with an inrush prevention current IS2 during the stable time period ST in FIG. 5. After that, the voltage of the smoothing capacitor 22 gradually recovers, and when the voltage has reached the switch reference voltage Vs, the opening and closing control unit 25B brings the relay unit 23 into a closed state, and the refrigeration cycle apparatus 20B returns to a steady state.

The refrigeration cycle apparatus 20B according to Embodiment 2 adopts the configuration in which, when the open signal is input from the DC circuit breaker 100 via the DC supply device 200, the opening and closing control unit 25B brings the relay unit 23 into the open state. Consequently, when the refrigeration cycle apparatus 20B is used, even when the DC circuit breaker 100 that was once open becomes closed again, because the input current io input from the DC supply device 200 goes through the resistor unit 24, it is possible to prevent an inrush current from flowing into the inside.

Embodiment 3

Figure 6:
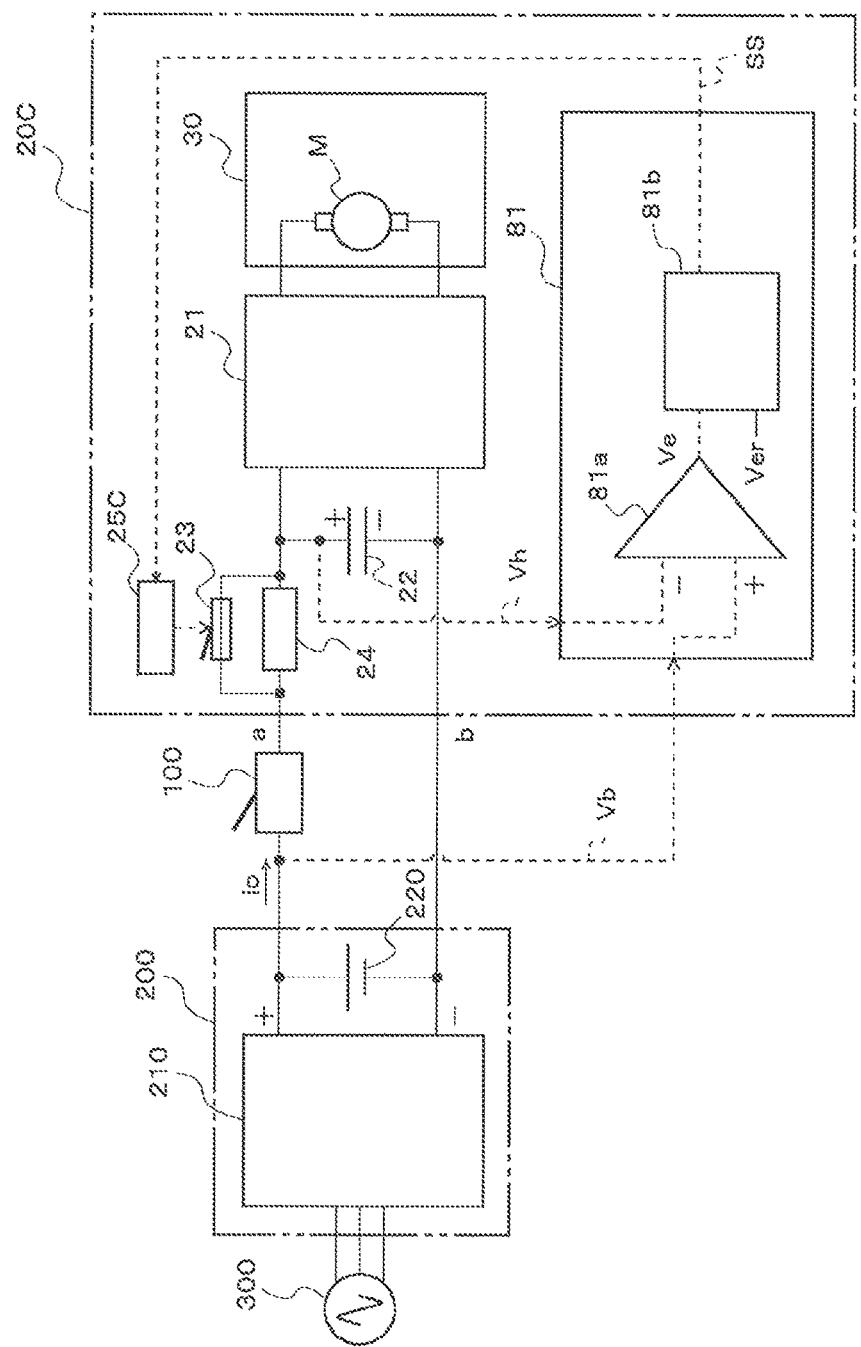
FIG. 6 is a circuit diagram illustrating a schematic configuration of an electrical system of a refrigeration cycle apparatus according to Embodiment 3 of the present invention.
Figure 7:
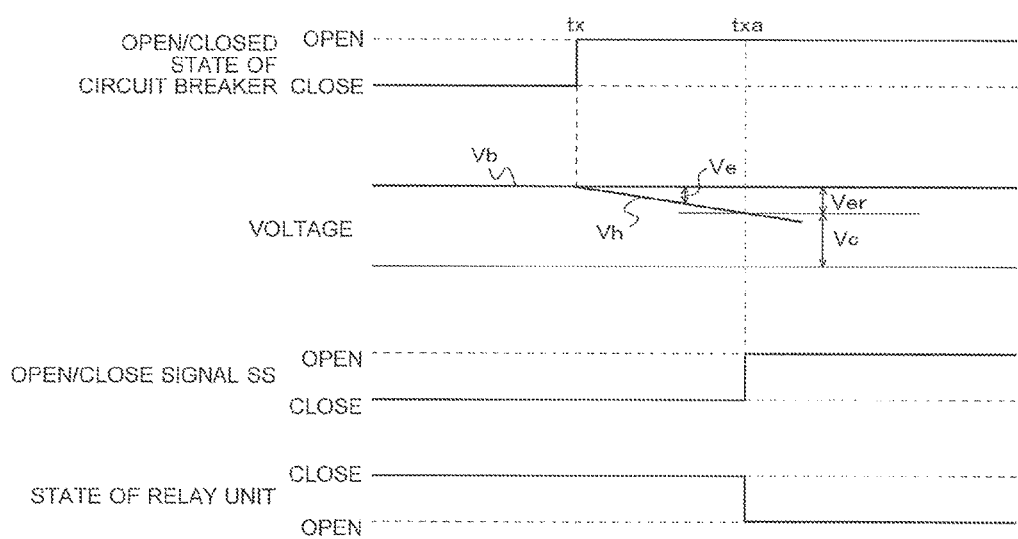
FIG. 7 is a time chart illustrating a relationship between a voltage of a smoothing capacitor and an output voltage of a battery in the refrigeration cycle apparatus illustrated in FIG. 6.

Next, a refrigeration cycle apparatus 20C according to Embodiment 3 of the present invention will be explained, with reference to FIG. 6 and FIG. 7. FIG. 6 is a circuit diagram illustrating a schematic configuration of an electrical system of the refrigeration cycle apparatus 20C according to Embodiment 3. FIG. 7 is a time chart illustrating a relationship between the voltage of the smoothing capacitor 22 and an output voltage of the battery 220 in the refrigeration cycle apparatus 20C. Some of the constituent members that are equivalent to those in Embodiments 1 and 2 described above will be referred to by using the same reference characters, and the explanations thereof will be omitted.

The refrigeration cycle apparatus 20C includes an opening and closing control unit 25C configured to bring the relay unit 23 into an open state, when a voltage difference Ve between an output voltage Vb of the battery 220 (the DC voltage input from the DC supply device 200) and a voltage Vh of the smoothing capacitor 22 exceeds a threshold voltage Ver set in advance. Further, the refrigeration cycle apparatus 20C also includes an open/close judging unit 81 configured to determine whether or not the DC circuit breaker 100 has become open.

The open/close judging unit 81 is configured to compare the output voltage Vb of the battery 220 with the voltage Vh of the smoothing capacitor 22 and to determine whether or not the DC circuit breaker 100 has become open, on the basis of the result of the comparison. As illustrated in FIG. 6, the open/close judging unit 81 includes: a subtractor 81a configured to calculate the voltage difference Ve by subtracting the voltage Vh of the smoothing capacitor 22 from the output voltage Vb of the battery 220; and a judging comparator 81b configured to compare the voltage difference Ve calculated by the subtractor 81a with the threshold voltage Ver and to output the result of the comparison to the opening and closing control unit 25C as an open/close signal SS indicating the open/closed state of the DC circuit breaker 100.

The judging comparator 81b is configured to determine that the DC circuit breaker 100 has become open when the voltage difference Ve calculated by the subtractor 81a exceeds the threshold voltage Ver and to output an open signal H indicating that the DC circuit breaker 100 has become open to the opening and closing control unit 25C, as the open/close signal SS.

While the refrigeration cycle apparatus 20C is in an operating state, when the DC circuit breaker 100 becomes open, because the voltage of the smoothing capacitor 22 decreases, the voltage difference Ve starts occurring, the voltage difference Ve being the difference between the output voltage Vb of the battery 220 and the voltage Vh of the smoothing capacitor 22. Further, when the refrigeration cycle apparatus 20C keeps operating even after the DC circuit breaker 100 becomes open, the voltage difference Ve increases as time elapses.

For this reason, Embodiment 3 adopts the configuration in which, at the point in time when the voltage difference Ve calculated by the subtractor 81a exceeds the threshold voltage Ver, the judging comparator 81b determines that the DC circuit breaker 100 has become open and outputs the open signal H serving as the open/close signal SS to the opening and closing control unit 25C. Further, Embodiment 3 also has the configuration in which the opening and closing control unit 25C brings the relay unit 23 into the open state, in response to the open signal H output from the judging comparator 81b.

Next, operations performed by the open/close judging unit 81 and the opening and closing control unit 25C will be explained, with reference to FIG. 7. When the DC circuit breaker 100 becomes open (at the time tx), the voltage Vh of the smoothing capacitor 22 starts decreasing, and the voltage difference Ve increases. At a time txa when the voltage difference Ve calculated by the subtractor 81a reaches the threshold voltage Ver, the judging comparator 81b outputs the open signal H serving as the open/close signal SS to the opening and closing control unit 25C. When receiving an input of the open signal H output from the judging comparator 81b, the opening and closing control unit 25C brings the relay unit 23 into the open state. Consequently, even when the DC circuit breaker 100 becomes closed again after that, because the smoothing capacitor 22 is charged with the current flowing in from the DC supply device 200 via the resistor unit 24, no excessive inrush current flows into the inside of the refrigeration cycle apparatus 20C.

After that, although not illustrated in FIG. 7, similarly to Embodiments 1 and 2 described above, the voltage of the smoothing capacitor 22 gradually recovers, and when the voltage has reached a predetermined value, the opening and closing control unit 25C brings the relay unit 23 into a closed state, and the refrigeration cycle apparatus 20C returns to a steady state.

The refrigeration cycle apparatus 20C according to Embodiment 3 adopts the configuration in which the relay unit 23 is brought into the open state by detecting that the DC circuit breaker 100 has become open on the basis of the transition of the voltage Vh of the smoothing capacitor 22, which decreases when the DC circuit breaker 100 becomes open. In other words, when the refrigeration cycle apparatus 20C is used, even when the DC circuit breaker 100 that was once open becomes closed again, because the input current io input from the DC supply device 200 goes through the resistor unit 24, it is possible to prevent an inrush current from flowing into the inside.

Embodiment 3 adopts the configuration in which, by using the output voltage Vb of the battery 220, which does not vary even when the DC circuit breaker 100 becomes open, as a reference, it is detected that the DC circuit breaker 100 is open on the basis of the transition of the voltage Vh of the smoothing capacitor 22 in view of the output voltage Vb of the battery 220. However, another arrangement is also acceptable in which the opening and closing control unit 25C brings the relay unit 23 into an open state when the voltage Vh of the smoothing capacitor 22 becomes lower than a reference voltage Vc (see FIG. 7) set in advance.

Embodiment 4

Figure 8:
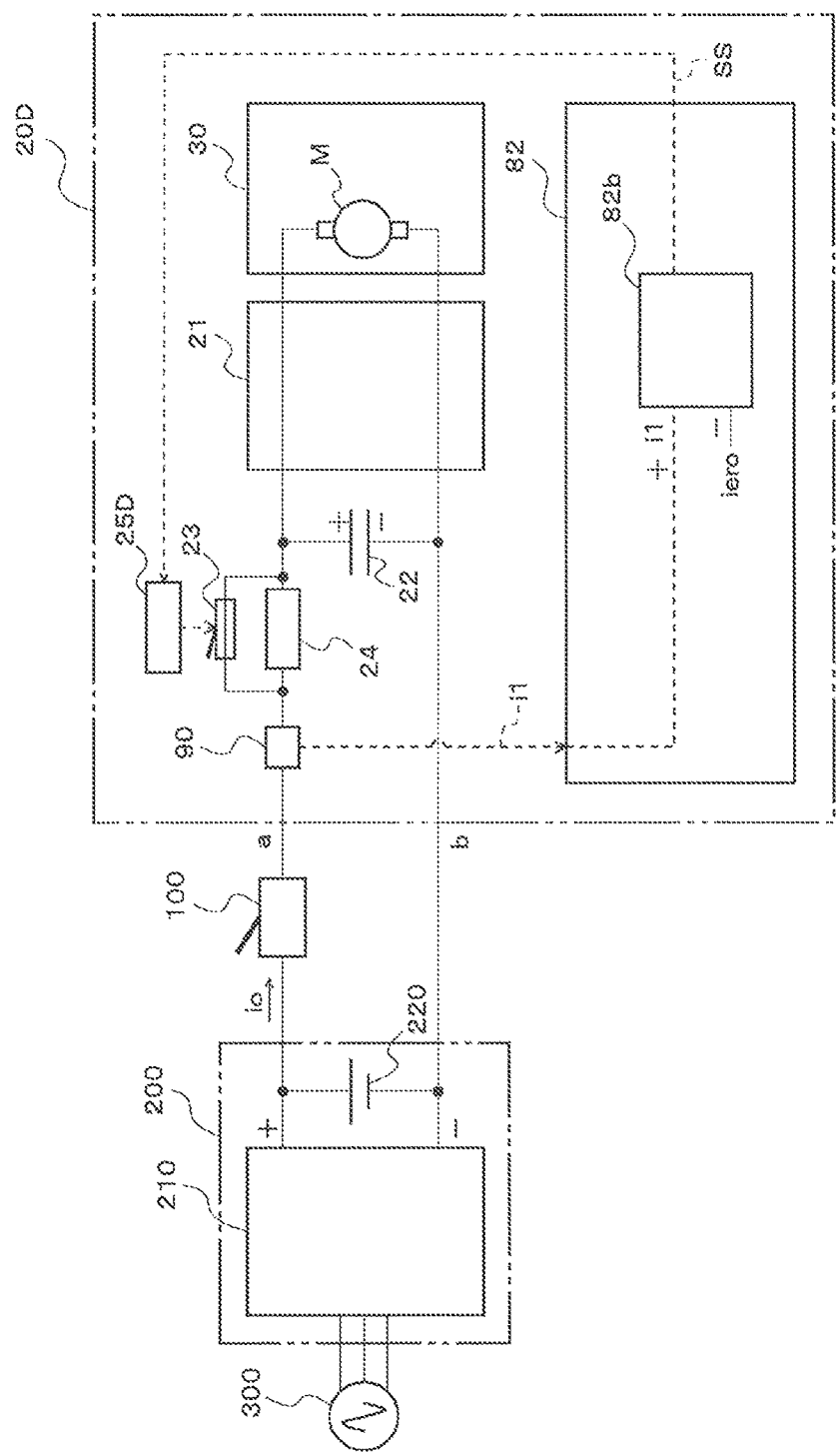
FIG. 8 is a circuit diagram illustrating a schematic configuration of an electrical system of a refrigeration cycle apparatus according to Embodiment 4 of the present invention.
Figure 9:
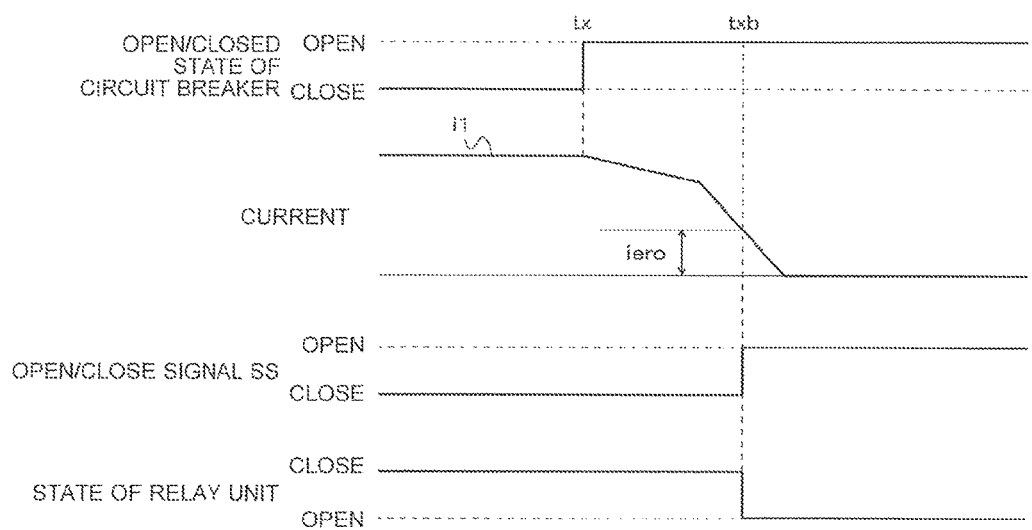
FIG. 9 is a time chart illustrating a transition in detection results obtained by a current sensor provided for the refrigeration cycle apparatus illustrated in FIG. 8.

Next, a refrigeration cycle apparatus 20D according to Embodiment 4 of the present invention will be explained with reference to FIG. 8 and FIG. 9. FIG. 8 is a circuit diagram illustrating a schematic configuration of an electrical system of the refrigeration cycle apparatus 20D according to Embodiment 4. FIG. 9 is a time chart illustrating a transition in detection results obtained by a current sensor 90 provided for the refrigeration cycle apparatus 20D. Some of the constituent members that are equivalent to those in Embodiments 1 to 3 described above will be referred to by using the same reference characters, and the explanations thereof will be omitted.

The refrigeration cycle apparatus 20D includes an opening and closing control unit 25D configured to bring the relay unit 23 into an open state, when the input current io input from the DC supply device 200 becomes smaller than a reference current iero set in advance.

Further, the refrigeration cycle apparatus 20D includes: the current sensor 90 configured to detect the input current io (the input current to the smoothing capacitor 22) input from the DC supply device 200 and to output a current signal i1 representing a result of the detection; and an open/close judging unit 82 configured to determine whether or not the DC circuit breaker 100 has become open on the basis of the level of the current signal i1 output from the current sensor 90. The open/close judging unit 82 includes a judging comparator (a judging comparator latch circuit) 82b configured to compare the current signal i1 output from the current sensor 90 with the reference current iero and to output a result of the comparison to the opening and closing control unit 25D as the open/close signal SS indicating the open/closed state of the DC circuit breaker 100.

While the refrigeration cycle apparatus 20D is in an operating state, when the DC circuit breaker 100 becomes open, the current stops being supplied from the upstream side of the refrigeration cycle apparatus 20D, i.e., from the DC supply device 200. For this reason, Embodiment 4 adopts the configuration in which, at the point in time when the current signal i1 indicating the input current io input from the DC supply device 200 becomes smaller than the reference current iero, the judging comparator 82b determines that the DC circuit breaker 100 has become open and outputs the open signal H serving as the open/close signal SS to the opening and closing control unit 25D. Further, the opening and closing control unit 25D is configured to bring the relay unit 23 into the open state, in response to the open signal H output from the judging comparator 82b.

Next, operations performed by the open/close judging unit 82 and the opening and closing control unit 25D will be explained, with reference to FIG. 9. When the DC circuit breaker 100 becomes open (at the time tx), the current signal i1 starts decreasing and becomes closer to the reference current iero. At a time txb when the current signal i1 output from the current sensor 90 reaches the reference current iero, the judging comparator 82b determines that the DC circuit breaker 100 has become open and outputs the open signal H serving as the open/close signal SS to the opening and closing control unit 25D.

When receiving an input of the open signal H output from the judging comparator 82b, the opening and closing control unit 25D brings the relay unit 23 into the open state. Consequently, even when the DC circuit breaker 100 becomes closed again after that, the smoothing capacitor 22 is charged with the current flowing in from the DC supply device 200 via the resistor unit 24. As a result, no excessive inrush current flows into the inside of the refrigeration cycle apparatus 20D.

After that, although not illustrated in FIG. 9, similarly to Embodiments 1 to 3 described above, the voltage of the smoothing capacitor 22 gradually recovers, and when the voltage has reached a predetermined value, the opening and closing control unit 25D brings the relay unit 23 into a closed state, and the refrigeration cycle apparatus 20D returns to a steady state.

Incidentally, according to the method described above, there is a possibility that the current signal i1 supplied from the current sensor 90 may become smaller than the reference current iero even when the motor M is driven with an extremely small load current. In Embodiment 4, when the current signal i1 becomes smaller than the reference current iero, the opening and closing control unit 25D brings the relay unit 23 into the open state. Consequently, there is a possibility that the current may keep being supplied to the load side via the resistor unit 24. For this reason, when the motor M is driven with an extremely small load current, it is desirable to address the situation by designing a configuration in which the consumption power of the resistor unit 24 (calculated as iero×iero×"resistance value of the resistor unit 24") does not exceed tolerated power of the resistor unit 24 (i.e., to satisfy the relationship "the consumption power of the resistor unit 24<the tolerated power of the resistor unit 24").

The refrigeration cycle apparatus 20D according to Embodiment 4 adopts the configuration in which the relay unit 23 is brought into the open state by detecting that the DC circuit breaker 100 has become open, on the basis of the transition of the input current io input from the DC supply device 200, the transition being exhibited after the DC circuit breaker 100 becomes open. In other words, when the refrigeration cycle apparatus 20D is used, even when the DC circuit breaker 100 that was once open becomes closed again, because the current flowing in from the DC supply device 200 goes through the resistor unit 24, it is possible to prevent an inrush current from flowing into the inside.

Embodiment 5

Figure 10:
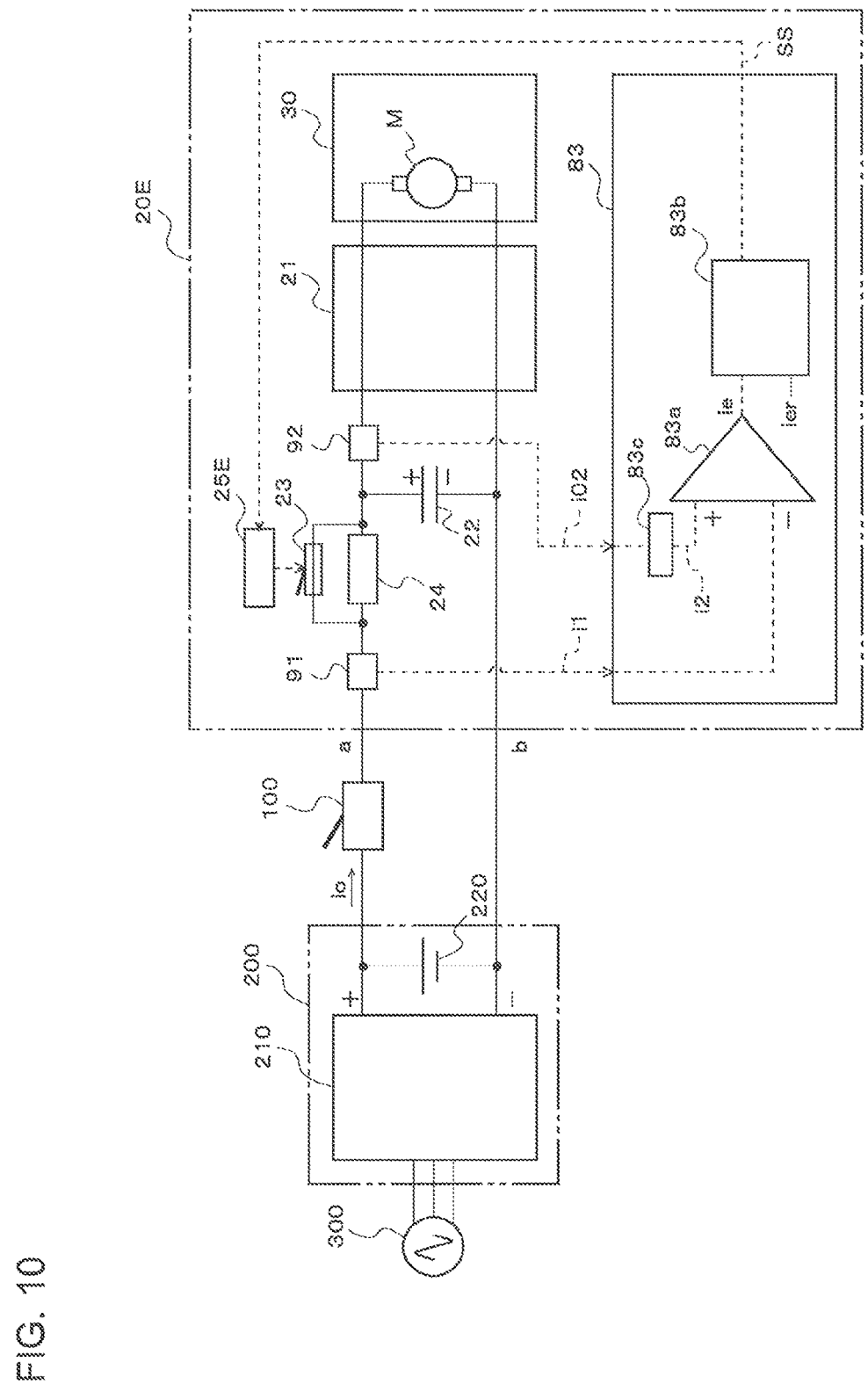
FIG. 10 is a circuit diagram illustrating a schematic configuration of an electrical system of a refrigeration cycle apparatus according to Embodiment 5 of the present invention.
Figure 11:
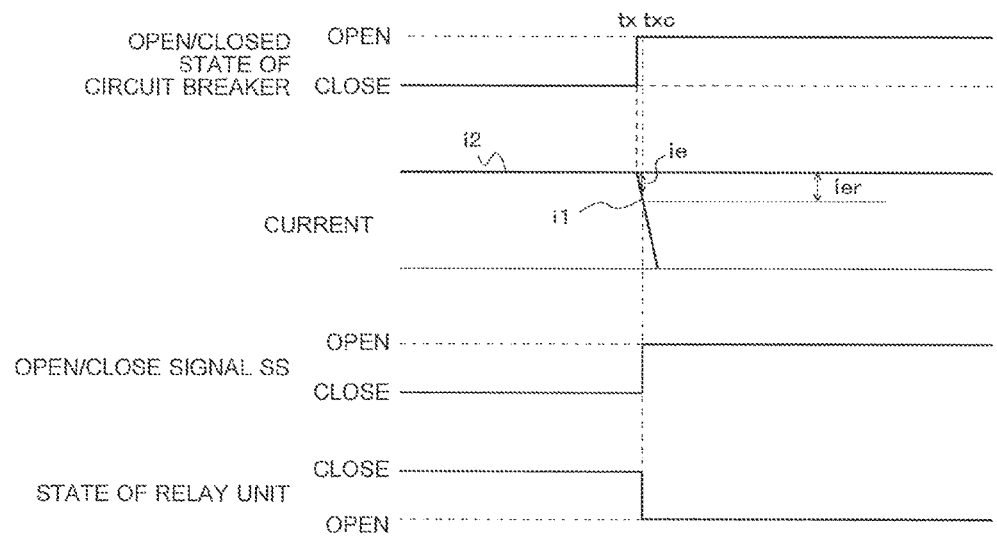
FIG. 11 is a time chart illustrating a transition in detection results obtained by a first current sensor and a second current sensor provided for the refrigeration cycle apparatus illustrated in FIG. 10.

Next, a refrigeration cycle apparatus 20E according to Embodiment 5 of the present invention will be explained on the basis of FIG. 10 and FIG. 11. FIG. 10 is a circuit diagram illustrating a schematic configuration of an electrical system of the refrigeration cycle apparatus 20E according to Embodiment 5. FIG. 11 is a time chart illustrating a transition in detection results obtained by a first current sensor 91 and a second current sensor 92 provided for the refrigeration cycle apparatus 20E. Some of the constituent members that are equivalent to those in Embodiments 1 to 4 described above will be referred to by using the same reference characters, and the explanations thereof will be omitted.

The refrigeration cycle apparatus 20E includes an opening and closing control unit 25E configured to bring the relay unit 23 into an open state, when a difference current ie calculated by subtracting the input current io (an inflow current of the smoothing capacitor 22) input from the DC supply device 200 from the current input to the DC/AC converter 21 (an outflow current of the smoothing capacitor 22) exceeds a threshold current ier set in advance.

Further, the refrigeration cycle apparatus 20E includes: the first current sensor 91 configured to detect the input current io input from the DC supply device 200 and to output the current signal i1 representing a result of the detection; the second current sensor 92 configured to detect the current input to the DC/AC converter 21 and to output a current signal i02 representing a result of the detection; and an open/close judging unit 83 configured to determine whether or not the DC circuit breaker 100 has become open, depending on which is larger between the current signal i1 and the current signal i02.

The open/close judging unit 83 includes: a current smoothing circuit 83c configured to smooth the current signal i02 input thereto from the second current sensor 92 and to output a current signal i2; a subtractor 83a configured to calculate the difference current ie by subtracting the current signal i1 output from the first current sensor 91 from the current signal i2 smoothed by the current smoothing circuit 83c; and a judging comparator 83b configured to compare the difference current ie calculated by the subtractor 83a with the threshold current ier and to output a result of the comparison to the opening and closing control unit 25E as the open/close signal SS indicating the open/closed state of the DC circuit breaker 100.

Generally speaking, the current flowing to the input side of the DC/AC converter 21 has a rectangular waveform. In other words, the current smoothing circuit 83c is provided for the purpose of generating the current signal i2 by smoothing the current signal i02 having a rectangular waveform, for example. Further, in Embodiment 5, the judging comparator 83b is configured to determine that the DC circuit breaker 100 has become open when the difference current ie calculated by the subtractor 83a exceeds the threshold current ier and to output the open signal H indicating that the DC circuit breaker 100 has become open to the opening and closing control unit 25E, as the open/close signal SS.

While the refrigeration cycle apparatus 20E is in an operating state, when the DC circuit breaker 100 becomes open, the current stops being supplied from the upstream side of the refrigeration cycle apparatus 20E; however, because the refrigeration cycle apparatus 20E keeps operating, the outflow current of the smoothing capacitor 22 keeps flowing to the load side. As a result, a difference occurs between the input current and the output current of the smoothing capacitor 22, so that the difference current ie indicating the difference between the current signal i1 representing the output of the first current sensor 91 and the current signal i2 representing the output of the current smoothing circuit 83c starts exhibiting a finite value.

For this reason, Embodiment 5 adopts the configuration in which, at the point in time when the difference current ie exceeds the threshold current ier, the judging comparator 83b determines that the DC circuit breaker 100 has become open and outputs the open signal H serving as the open/close signal SS to the opening and closing control unit 25E. Further, the opening and closing control unit 25E is configured to bring the relay unit 23 into the open state, in response to the open signal H output from the judging comparator 83b. In other words, the opening and closing control unit 25E uses the difference between the value detected by the first current sensor 91 and the value detected by the second current sensor 92 as the difference current ie.

Next, operations performed by the open/close judging unit 83 and the opening and closing control unit 25E will be explained with reference to FIG. 11. When the DC circuit breaker 100 becomes open (at the time tx), because the current stops being supplied from the DC circuit breaker 100, the difference current ie increases. At a time txc when the difference current ie calculated by the subtractor 83a reaches the threshold current ier, the judging comparator 83b outputs the open signal H serving as the open/close signal SS, to the opening and closing control unit 25E. When receiving an input of the open signal H output from the judging comparator 83b, the opening and closing control unit 25E brings the relay unit 23 into the open state.

After that, although not illustrated in FIG. 11, similarly to Embodiments 1 to 4 described above, the voltage of the smoothing capacitor 22 gradually recovers, and when the voltage has reached a predetermined value, the opening and closing control unit 25E brings the relay unit 23 into a closed state, and the refrigeration cycle apparatus 20E returns to a steady state.

The refrigeration cycle apparatus 20E according to Embodiment 5 is configured to understand the transition of the input current io input from the DC supply device 200 by comparing the inflow current and the outflow current of the smoothing capacitor 22 with each other. Further, the refrigeration cycle apparatus 20E adopts the configuration in which the relay unit 23 is brought into the open state by detecting that the DC circuit breaker 100 has become open on the basis of the transition of the input current io input from the DC supply device 200. Consequently, when the refrigeration cycle apparatus 20E is used, even when the DC circuit breaker 100 that was once open becomes closed again, because the input current io input from the DC supply device 200 goes through the resistor unit 24, it is possible to prevent an inrush current from flowing into the inside.

Alternatively, the open/close judging unit 83 may adopt a configuration in which the current smoothing circuit 83c is provided on the downstream side of the subtractor 83a. In other words, the subtractor 83a may be configured to calculate the difference current by subtracting the current signal i1 output from the first current sensor 91 from the current signal i02 output from the second current sensor 92, while the current smoothing circuit 83c is configured to calculate the difference current ie by smoothing the difference current calculated by the subtractor 83a. In another example, the opening and closing control unit 25E may be configured to receive an input of the current signal i1 from the first current sensor 91, to also receive an input of the current signal i2 from the second current sensor 92 via the current smoothing circuit 83c, to calculate the difference current ie by subtracting the current signal i1 from the current signal i2, and to determine whether or not the DC circuit breaker 100 has become open by comparing the calculated difference current ie with the threshold current ier.

Embodiment 6

Figure 12:
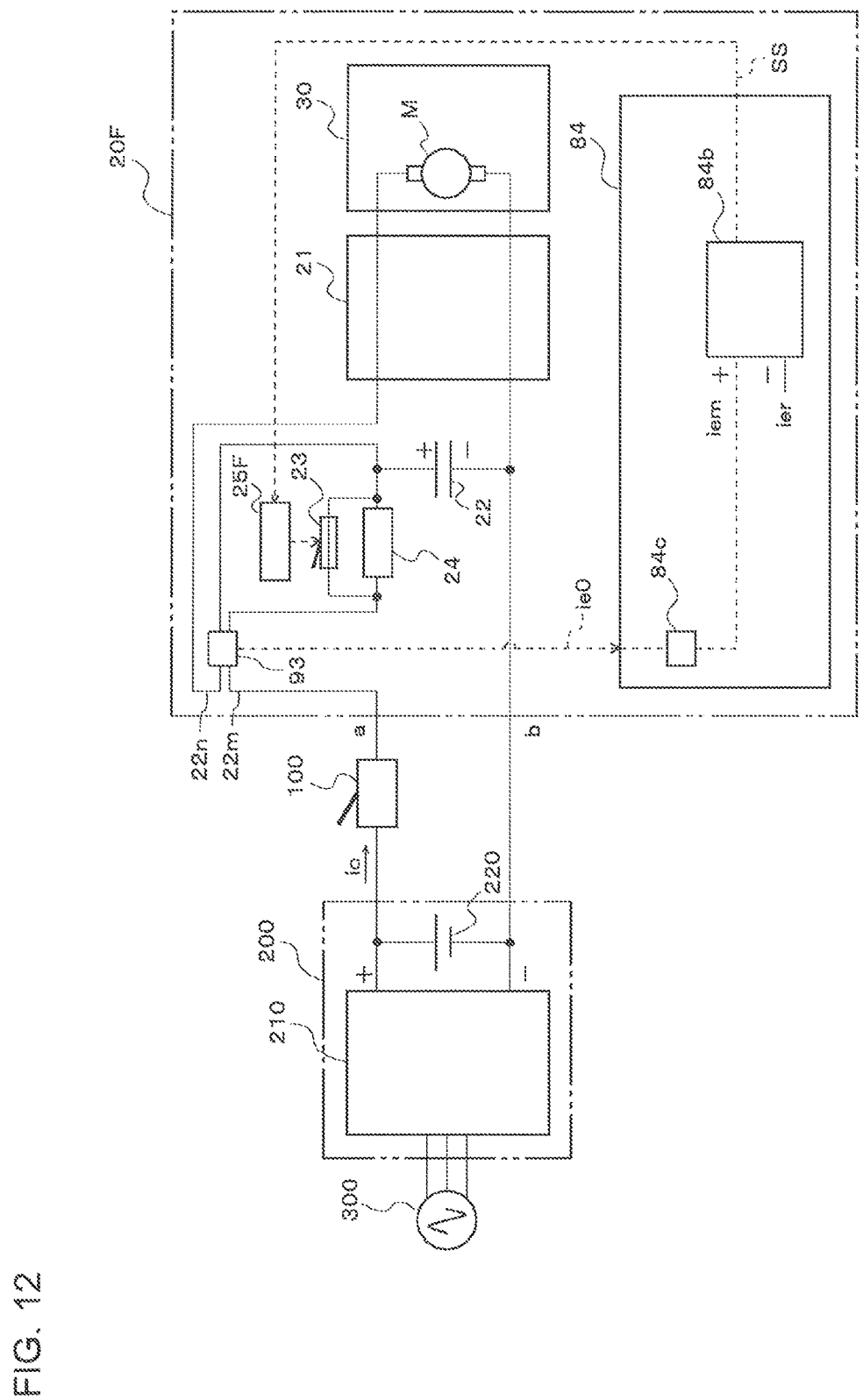
FIG. 12 is a circuit diagram illustrating a schematic configuration of an electrical system of a refrigeration cycle apparatus according to Embodiment 6 of the present invention.
Figure 13:
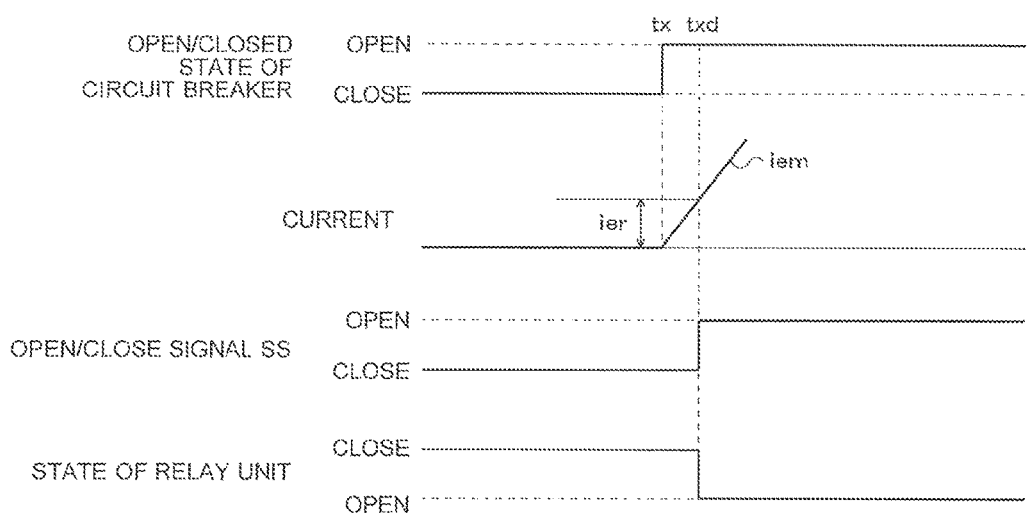
FIG. 13 is a time chart illustrating a transition in detection results obtained by a difference detecting sensor provided for the refrigeration cycle apparatus illustrated in FIG. 12.

Next, a refrigeration cycle apparatus 20F according to Embodiment 6 of the present invention will be explained with reference to FIG. 12 and FIG. 13. FIG. 12 is a circuit diagram illustrating a schematic configuration of an electrical system of the refrigeration cycle apparatus 20F according to Embodiment 6. FIG. 13 is a time chart illustrating a transition in detection results obtained by a difference detecting sensor 93 provided for the refrigeration cycle apparatus 20F. Some of the constituent members that are equivalent to those in Embodiments 1 to 5 described above will be referred to by using the same reference characters, and the explanations thereof will be omitted.

The refrigeration cycle apparatus 20F includes an opening and closing control unit 25F configured to bring the relay unit 23 into an open state when a difference current iem corresponding to the difference obtained by subtracting the input current io input from the DC supply device 200 from a current input to the DC/AC converter 21 exceeds the threshold current ier set in advance.

Further, the refrigeration cycle apparatus 20F includes: the difference detecting sensor 93 configured to detect a difference current ie0 representing the difference between a current flowing in an input wiring 22m and a current flowing in an output wiring 22n and to output the difference current ie0 to the outside thereof; a difference smoothing circuit 84c configured to smooth the difference current ie0 output from the difference detecting sensor 93 and to output the difference current iem, and a judging comparator 84b configured to compare the difference current iem output from the difference smoothing circuit 84c with the threshold current ier and to output a result of the comparison to the opening and closing control unit 25F as the open/close signal SS indicating the open/closed state of the DC circuit breaker 100.

The difference detecting sensor 93 is configured by using, for example, a penetration-type current sensor. The input wiring 22m and the output wiring 22n of the smoothing capacitor 22 penetrate through the inside of the difference detecting sensor 93 in such a manner that magnetic fluxes generated thereby cancel out each other. More specifically, on the inside of the difference detecting sensor 93, the input wiring 22m and the output wiring 22n are arranged to penetrate a Hall sensor, a Current Transformer (CT), or another device. In other words, the difference detecting sensor 93 is configured to sense the magnitudes of the magnetic fluxes generated by the input wiring 22m and the output wiring 22n penetrating therethrough and to detect the difference current ie0.

Further, generally speaking, because the current flowing to the input side of the DC/AC converter 21 has a rectangular waveform, the difference current ie0, which is an output from the difference detecting sensor 93, also has a rectangular waveform. In other words, the difference smoothing circuit 84c is provided for the purpose of smoothing a rectangular wave component exhibited in the difference current ie0 provided from the difference detecting sensor 93.

Further, in Embodiment 6, the judging comparator 84b is configured to determine that the DC circuit breaker 100 has become open when the difference current iem output from the difference smoothing circuit 84c exceeds the threshold current ier and to output the open signal H indicating that the DC circuit breaker 100 has become open to the opening and closing control unit 25F, as the open/close signal SS.

Similarly to Embodiment 5 described above, when the DC circuit breaker 100 becomes open, so that a difference occurs in the current flowing between the input wiring 22m and the output wiring 22n, the difference current iem, which is an output of the difference smoothing circuit 84c, has a finite value. For this reason, Embodiment 6 adopts the configuration in which, at the point in time when the difference current iem exceeds the threshold current ier, the judging comparator 84b determines that the DC circuit breaker 100 has become open and outputs the open signal H serving as the open/close signal SS to the opening and closing control unit 25F. Further, the opening and closing control unit 25F is configured to bring the relay unit 23 into the open state, in response to the open signal H output from the judging comparator 84b.

Next, operations performed by the open/close judging unit 84 and the opening and closing control unit 25F will be explained, with reference to FIG. 13. When the DC circuit breaker 100 becomes open (at the time tx), because the current stops being supplied from the DC circuit breaker 100, the difference current iem increases. Further, at a time txd when the difference current iem input from the difference smoothing circuit 84c reaches the threshold current ier, the judging comparator 84b outputs the open signal H serving as the open/close signal SS to the opening and closing control unit 25F. When receiving an input of the open signal H output from the judging comparator 84b, the opening and closing control unit 25F brings the relay unit 23 into the open state.

After that, although not illustrated in FIG. 13, similarly to Embodiments 1 to 5 described above, the voltage of the smoothing capacitor 22 gradually recovers, and when the voltage has reached a predetermined value, the opening and closing control unit 25F brings the relay unit 23 into a closed state, and the refrigeration cycle apparatus 20F returns to a steady state.

The refrigeration cycle apparatus 20F according to Embodiment 6 includes the difference detecting sensor 93 penetrated by the input wiring 22m and the output wiring 22n of the smoothing capacitor in such a manner that the currents therein flow in the opposite directions to each other. Consequently, by using the single sensor, it is possible to detect the difference between the current input to the DC/AC converter 21 and the input current io input from the DC supply device 200. Further, the refrigeration cycle apparatus 20F adopts the configuration in which the relay unit 23 is brought into the open state by detecting that the DC circuit breaker 100 has become open on the basis of the difference. Consequently, when the refrigeration cycle apparatus 20F is used, even when the DC circuit breaker 100 that was once open becomes closed again, because the input current io input from the DC supply device 200 goes through the resistor unit 24, it is possible to prevent an inrush current from flowing into the inside.

Embodiment 7

Figure 14:
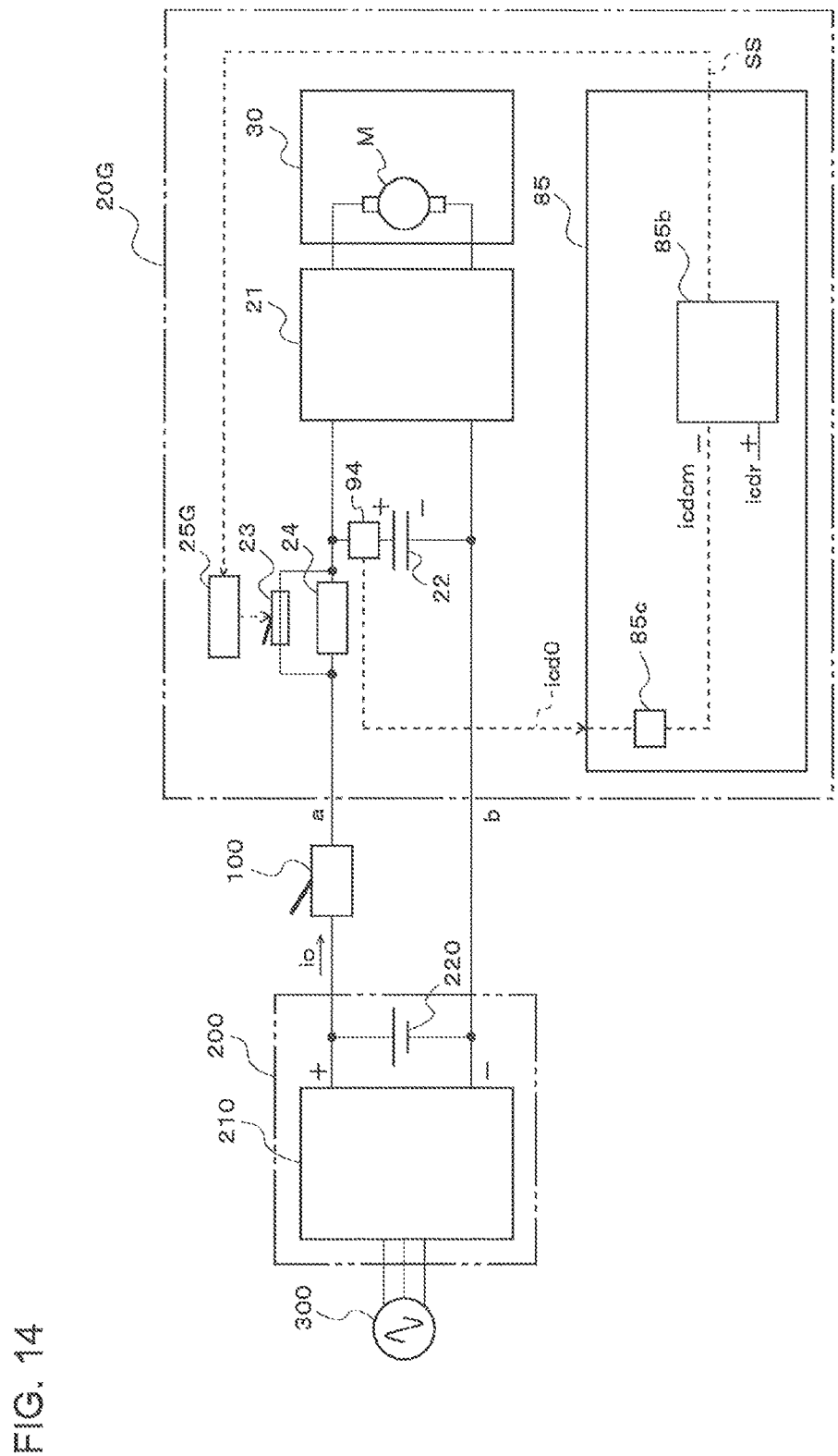
FIG. 14 is a circuit diagram illustrating a schematic configuration of an electrical system of a refrigeration cycle apparatus according to Embodiment 7 of the present invention.
Figure 15:
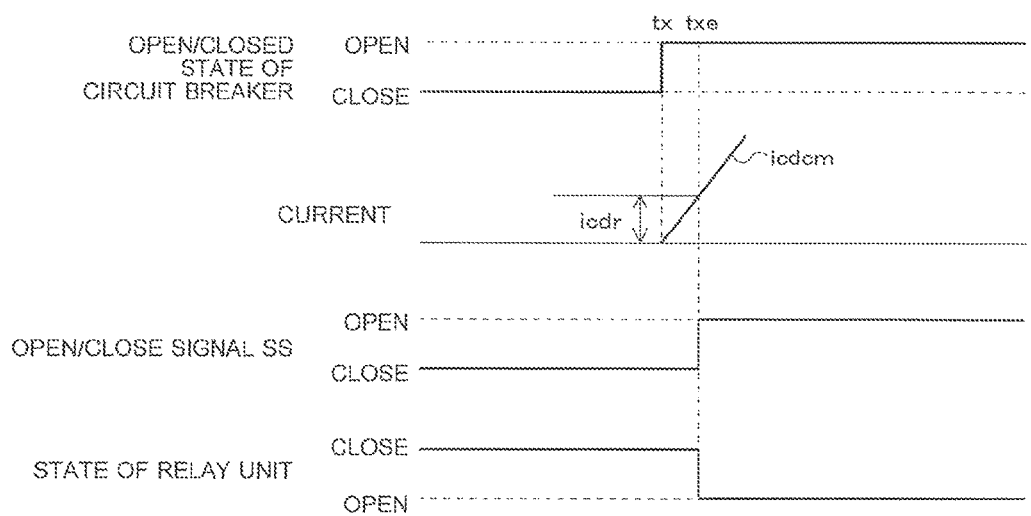
FIG. 15 is a time chart illustrating a transition in detection results obtained by a current sensor provided on an output side of a smoothing capacitor in the refrigeration cycle apparatus illustrated in FIG. 14.
Figure 16:
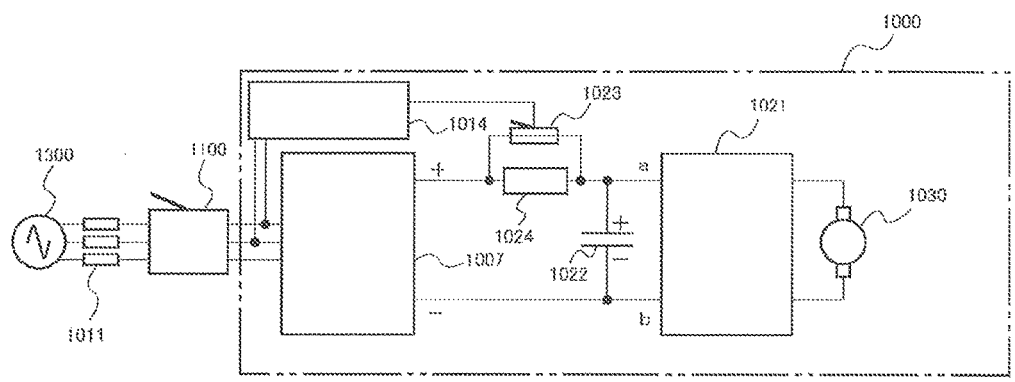
FIG. 16 is a circuit diagram illustrating a schematic configuration of an electrical system of an AC-input type refrigeration cycle apparatus.
Figure 17:
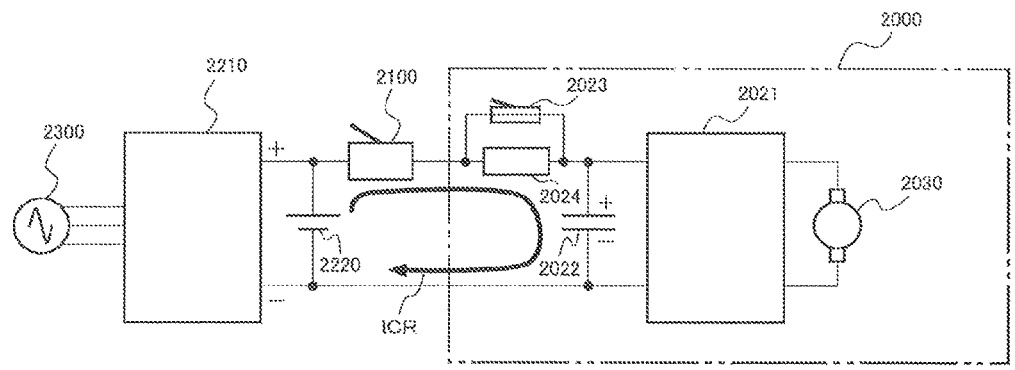
FIG. 17 is a circuit diagram illustrating a schematic configuration of an electrical system of a DC-input type refrigeration cycle apparatus.

Next, a refrigeration cycle apparatus 20G according to Embodiment 7 of the present invention will be explained with reference to FIG. 14 and FIG. 15. FIG. 14 is a circuit diagram illustrating a schematic configuration of an electrical system of the refrigeration cycle apparatus 20G according to Embodiment 7. FIG. 15 is a time chart illustrating a transition in detection results obtained by a current sensor 94 provided on the output side of the smoothing capacitor 22 in the refrigeration cycle apparatus 20G. Some of the constituent members that are equivalent to those in Embodiments 1 to 6 described above will be referred to by using the same reference characters, and the explanations thereof will be omitted.

The refrigeration cycle apparatus 20G includes an opening and closing control unit 25G configured to bring the relay unit 23 into an open state when an output current icdcm provided from the smoothing capacitor 22 exceeds a smoothing reference current icdr set in advance. Further, the refrigeration cycle apparatus 20G includes: the current sensor 94 configured to detect and output an output current icd0 provided from the smoothing capacitor 22; and an open/close judging unit 85 configured to determine whether or not the DC circuit breaker 100 has become open, on the basis of the level of the output current icd0 provided from the current sensor 94.

The open/close judging unit 85 includes: a current smoothing circuit 85c configured to smooth the output current icd0 provided from the current sensor 94 and to extract and output the output current icdcm corresponding to a direct current; and a judging comparator 85b configured to compare the output current icdcm provided from the current smoothing circuit 85c with the smoothing reference current icdr and to output a result of the comparison to the opening and closing control unit 25G as the open/close signal SS indicating the open/closed state of the DC circuit breaker 100.

While the refrigeration cycle apparatus 20G is in an operating state, when the DC circuit breaker 100 becomes open, the current stops being supplied from the upstream side of the refrigeration cycle apparatus 20D. However, the smoothing capacitor 22 keeps causing the current to flow to the DC/AC converter 21 for the purpose of driving the motor M. In other words, a direct current flows out of the smoothing capacitor 22.

For this reason, Embodiment 7 adopts the configuration in which, at the point in time when the output current icdcm output from the current smoothing circuit 85c becomes larger than the smoothing reference current icdr, the judging comparator 85b determines that the DC circuit breaker 100 has become open and outputs the open signal H serving as the open/close signal SS to the opening and closing control unit 25G. Further, the opening and closing control unit 25G is configured to bring the relay unit 23 into the open state, in response to the open signal H output from the judging comparator 85b.

Next, operations performed by the open/close judging unit 85 and the opening and closing control unit 25G will be explained, with reference to FIG. 15. When the DC circuit breaker 100 becomes open (at the time tx), the output current icdcm provided from the smoothing capacitor 22 increases. At a time txe when the output current icdcm provided from the current smoothing circuit 85c reaches the smoothing reference current icdr, the judging comparator 85b determines that the DC circuit breaker 100 has become open and outputs the open signal H serving as the open/close signal SS to the opening and closing control unit 25G. When receiving an input of the open signal H output from the judging comparator 85b, the opening and closing control unit 25G brings the relay unit 23 into the open state.

After that, although not illustrated in FIG. 15, similarly to Embodiments 1 to 6 described above, the voltage of the smoothing capacitor 22 gradually recovers, and when the voltage has reached a predetermined value, the opening and closing control unit 25G brings the relay unit 23 into a closed state, and the refrigeration cycle apparatus 20G returns to a steady state.

The refrigeration cycle apparatus 20G according to Embodiment 7 adopts the configuration in which the relay unit 23 is brought into the open state by detecting that the DC circuit breaker 100 has become open on the basis of the level of the direct current flowing out of the smoothing capacitor 22. In other words, when the refrigeration cycle apparatus 20G is used, even when the DC circuit breaker 100 that was once open becomes closed again, because the current flowing in from the DC supply device 200 goes through the resistor unit 24, it is possible to prevent an inrush current from flowing into the inside.

As explained above, each of the refrigeration cycle apparatuses 20A to 20G according to Embodiments 1 to 7 described above adopts the configuration that includes the relay unit 23 connected to the DC supply device 200 via the DC circuit breaker 100 and the resistor unit 24 connected in parallel to the relay unit 23. Also, each of the opening and closing control units 25A to 25G is configured to bring the relay unit into the open state when the DC circuit breaker 100 becomes open. Accordingly, when the DC circuit breaker 100 transitions from the open state into a closed state again, the current flowing in from the DC supply device 200 goes through the resistor unit 24 and flows into the smoothing capacitor 22. It is therefore possible to prevent an excessive current from flowing in, when the DC circuit breaker transitions from the open state into the closed state. Consequently, when any of the refrigeration cycle apparatuses 20A to 20G is used, it is possible to prevent the various component parts provided on the path from the battery 220 to the smoothing capacitor 22 or another path, from being damaged.

The embodiments described above are preferred embodiments of the refrigeration cycle apparatuses, but the technical scope of the present invention is not limited to these modes. For example, each of Embodiments 1 to 7 described above illustrates the configuration (see FIG. 2) in which the main circuit of a corresponding one of the refrigeration cycle apparatuses 20A to 20G drives, as the motor M, at least one selected from among the compressor motor M1, the fan motor M2, and the fan motor M3. However, another configuration is also acceptable in which, instead of the motor M, another load that supplies a voltage from a DC bus via the smoothing capacitor 22 is installed and driven by the DC/AC converter 21. By using this configuration, it is also possible to achieve the same advantageous effects as those achieved by the embodiments described above. Further, although FIG. 6, FIG. 8, FIG. 10, FIG. 12, and FIG. 14 illustrate the examples in which the open/close judging units 81 to 85 are each provided on the inside of a corresponding one of the refrigeration cycle apparatuses 20C to 20G, possible embodiments are not limited to these example. For instance, it is also acceptable to provide any of the open/close judging units 81 to 85 on the outside of a corresponding one of the refrigeration cycle apparatuses 20C to 20G and to structure a refrigeration cycle system by combining any of the refrigeration cycle apparatuses 20C to 20G with a corresponding one of the open/close judging units 81 to 85. Needless to say, it is also acceptable to provide a configuration that is similar to or the same as any of the judging comparators 81b to 85b, on the inside of a corresponding one of the opening and closing control units 25C to 25G.

REFERENCE SIGNS LIST 1 compressor 1a belt heater 2, 3 fan 4 expansion valve 5 use side heat exchanger 6 indoor solenoid valve 7 pressure open/close switch 8 heat source side heat exchanger 9 outdoor solenoid valve 10, 11 refrigerant pipe 20A to 20G refrigeration cycle apparatus 21, 1021, 2021 DC/AC converter 22, 1022, 2022 smoothing capacitor 22m input wiring 22n output wiring 23, 1023, 2023 relay unit 24 resistor unit 25A to 25G opening and closing control unit 30 refrigerant circuit system 31 refrigerant circuit 40 indoor unit 50 indoor control device 51, 71 arithmetic device 60 outdoor unit 70 outdoor control device 81 to open/close judging unit 81a, 83a subtractor 81b to 85b judging comparator 83c, 85c current smoothing circuit 84c difference smoothing circuit 90 current sensor 91 first current sensor 92 second current sensor 93 difference detecting sensor 94 current sensor 100, 2100 DC circuit breaker 200 DC supply device 210, 2210 AC/DC converter 220, 2220 battery 300 AC system 1000 AC refrigeration cycle apparatus 1007 three-phase full-wave rectifying circuit 1011 system impedance 1014 zero-cross sensor 1024, 2024 resistor circuit 1030, 2030 compressor motor 1100 AC circuit breaker 1300 AC system 2000 DC refrigeration cycle apparatus 2300 AC system H open signal ICR overcurrent route IS1, IS2 inrush prevention current M motor M1 compressor motor M2, M3 fan motor S1 open/close signal SC steady-state currentSS open/close signal ST stable time period Th insufficient voltage judgment threshold value Vb output voltage Vc reference voltage Ve voltage difference Ver threshold voltage Vh voltage Vs switch reference voltage io input current i1, i02, i2 current signal icd0, icdcm output current icdr smoothing reference current ie, ie0, iem difference current ier threshold current iero reference current $\Delta V$ difference

The invention claimed is:

1. A refrigeration cycle apparatus comprising:
a refrigerant circuit structured by sequentially connecting a compressor having a compressor motor, a use side heat exchanger, a pressure reducing valve, and a heat source side heat exchanger, by using a refrigerant pipe;
a fan that is provided together with at least one, selected from between, the use side heat exchanger and the heat source side heat exchanger and that has a fan motor;
a relay unit connected to a direct-current supply device via a direct-current circuit breaker;
a resistor unit connected in parallel to the relay unit;
a DC/AC converter configured to convert a direct-current voltage supplied from the direct-current supply device via either the relay unit or the resistor unit into an alternating-current voltage and to supply the alternating-current voltage to at least one, selected from between, the compressor motor and the fan motor;
a smoothing capacitor connected to an input terminal of the DC/AC converter and configured to smooth the direct-current voltage input thereto from the direct-current supply device, and
a controller configured to bring the relay unit into an open state when the direct-current circuit breaker becomes open, wherein the direct-current supply device includes a battery, and
the controller is configured to bring the relay unit into a closed state when a voltage of the smoothing capacitor has increased to a switch reference voltage, the switch reference voltage being set based on a voltage of the battery.

2. The refrigeration cycle apparatus of claim 1, wherein the controller is configured to bring the relay unit into the open state when receiving an input of an open signal being output from the direct-current circuit breaker and indicating that the direct-current circuit breaker is open.

3. The refrigeration cycle apparatus of claim 2, wherein the open signal is output from the direct-current circuit breaker via the direct-current supply device.

4. The refrigeration cycle apparatus of claim 1, wherein the controller brings the relay unit into the open state when a voltage of the smoothing capacitor becomes lower than a reference voltage set in advance.

5. The refrigeration cycle apparatus of claim 1, wherein the controller brings the relay unit into the open state when a voltage difference between an output voltage of the battery and a voltage of the smoothing capacitor exceeds a threshold voltage set in advance.

6. The refrigeration cycle apparatus of claim 1, wherein the controller brings the relay unit into the open state when an input current input from the direct-current supply device becomes smaller than a reference current set in advance.

7. The refrigeration cycle apparatus of claim 1, wherein the controller brings the relay unit into the open state when a difference current calculated by subtracting an input current input from the direct-current supply device from a current input to the DC/AC converter exceeds a threshold current set in advance.

8. The refrigeration cycle apparatus of claim 7, further comprising
a first current sensor configured to detect the input current input from the direct-current supply device; and
a second current sensor configured to detect the current input to the DC/AC converter, wherein
the controller uses a difference between a value detected by the first current sensor and a value detected by the second current sensor as the difference current.

9. The refrigeration cycle apparatus of claim 7, further comprising
a difference detecting sensor configured to detect the difference current and wired in such a manner that a current supplied from the direct-current supply device and the current input to the DC/AC converter flow in directions opposite to each other.

10. The refrigeration cycle apparatus of claim 1, wherein the controller brings the relay unit into the open state when an output current from the smoothing capacitor exceeds a smoothing reference current set in advance.

11. The refrigeration cycle apparatus of claim 1, further comprising
an AC/DC converter configured to convert the alternating-current voltage supplied from the alternating-current power supply device into a direct-current voltage, and
the battery being provided on an output side of the AC/DC converter.

* * * * *